US009397766B2

(12) United States Patent
Puzella et al.

(10) Patent No.: US 9,397,766 B2
(45) Date of Patent: Jul. 19, 2016

(54) CALIBRATION SYSTEM AND TECHNIQUE FOR A SCALABLE, ANALOG MONOPULSE NETWORK

(71) Applicant: Raytheon Company, Waltham, MA (US)

(72) Inventors: Angelo M. Puzella, Marlborough, MA (US); Jeffrey C. Upton, Groton, MA (US); Arsenio Vargas, Shrewsbury, MA (US); Steven D. Nguyen, Lowell, MA (US); Kassam K. Bellahrossi, Pelham, NH (US)

(73) Assignee: Raytheon Company, Waltham, MA (US)

( * ) Notice: Subject to any disclaimer, the term of this patent is extended or adjusted under 35 U.S.C. 154(b) by 333 days.

(21) Appl. No.: 14/072,949

(22) Filed: Nov. 6, 2013

(65) Prior Publication Data

US 2014/0111373 A1    Apr. 24, 2014

Related U.S. Application Data

(63) Continuation of application No. 13/267,193, filed on Oct. 6, 2011, now Pat. No. 9,124,361.

(51) Int. Cl.
| | |
|---|---|
| *G01S 7/40* | (2006.01) |
| *H04B 17/21* | (2015.01) |
| *H01Q 25/02* | (2006.01) |
| *H01Q 3/26* | (2006.01) |
| *H01Q 21/00* | (2006.01) |
| *G01S 7/03* | (2006.01) |
| *G01S 13/44* | (2006.01) |

(52) U.S. Cl.
CPC ............ *H04B 17/21* (2015.01); *G01S 7/032* (2013.01); *G01S 13/4463* (2013.01); *H01Q 3/26* (2013.01); *H01Q 21/0025* (2013.01); *H01Q 21/0093* (2013.01); *H01Q 25/02* (2013.01)

(58) Field of Classification Search
CPC ..... H04B 17/21; G01S 7/032; G01S 13/4463; H01Q 21/0093
USPC .......................................... 342/154, 165–174
See application file for complete search history.

(56) References Cited

U.S. PATENT DOCUMENTS

| | | | |
|---|---|---|---|
| 3,091,743 | A | 5/1963 | Wilkinson |
| 3,665,480 | A | 5/1972 | Fassett |
| 4,075,566 | A | 2/1978 | D'Arcangelis |

(Continued)

FOREIGN PATENT DOCUMENTS

| | | |
|---|---|---|
| EP | 0 481 417 A1 | 4/1992 |
| EP | 1 764 863 A1 | 3/2007 |

(Continued)

OTHER PUBLICATIONS

Office Action dated Mar. 12, 2015 for U.S. Appl. No. 13/267,193; 16 pages.

(Continued)

*Primary Examiner* — John B Sotomayor
*Assistant Examiner* — Marcus Windrich
(74) *Attorney, Agent, or Firm* — Daly, Crowley, Mofford & Durkee, LLP

(57) ABSTRACT

Described is a calibration technique for an Active Electronically Scanned Array (AESA) having a scalable, analog monopulse network.

20 Claims, 11 Drawing Sheets

(56) References Cited

U.S. PATENT DOCUMENTS

| | | | |
|---|---|---|---|
| 4,489,363 A | 12/1984 | Goldberg | |
| 4,527,165 A | 7/1985 | deRonde | |
| 4,698,663 A | 10/1987 | Sugimoto et al. | |
| 4,706,094 A | 11/1987 | Kubick | |
| 4,751,513 A | 6/1988 | Daryoush et al. | |
| 4,835,658 A | 5/1989 | Bonnefoy | |
| 5,005,019 A | 4/1991 | Zaghloul et al. | |
| 5,055,852 A | 10/1991 | Dusseux et al. | |
| 5,099,254 A | 3/1992 | Tsukii et al. | |
| 5,276,452 A | 1/1994 | Schuss et al. | |
| 5,276,455 A | 1/1994 | Fitzsimmons et al. | |
| 5,398,010 A | 3/1995 | Klebe | |
| 5,400,040 A | 3/1995 | Lane et al. | |
| 5,404,148 A | 4/1995 | Zwarts | |
| 5,412,414 A * | 5/1995 | Ast | H01Q 21/0025 342/174 |
| 5,451,969 A | 9/1995 | Toth et al. | |
| 5,459,474 A | 10/1995 | Mattioli et al. | |
| 5,461,389 A | 10/1995 | Dean | |
| 5,471,220 A | 11/1995 | Hammers et al. | |
| 5,488,380 A | 1/1996 | Harvey et al. | |
| 5,493,305 A | 2/1996 | Wooldridge et al. | |
| 5,563,613 A | 10/1996 | Schroeder et al. | |
| 5,592,178 A | 1/1997 | Chang et al. | |
| 5,592,363 A | 1/1997 | Atarashi et al. | |
| 5,675,345 A | 10/1997 | Pozgay et al. | |
| 5,682,165 A * | 10/1997 | Lewis | H01Q 21/0025 342/174 |
| 5,724,048 A | 3/1998 | Remondiere | |
| 5,786,792 A | 7/1998 | Bellus et al. | |
| 5,854,607 A | 12/1998 | Kinghorn | |
| 5,864,317 A * | 1/1999 | Boe | H01Q 3/267 342/368 |
| 5,907,304 A | 5/1999 | Wilson et al. | |
| 6,011,507 A | 1/2000 | Curran et al. | |
| 6,037,903 A | 3/2000 | Lange et al. | |
| 6,061,027 A | 5/2000 | Legay et al. | |
| 6,078,289 A | 6/2000 | Manoogian et al. | |
| 6,084,545 A * | 7/2000 | Lier | H01Q 3/267 342/174 |
| 6,087,988 A | 7/2000 | Pozgay | |
| 6,091,373 A | 7/2000 | Raguenet | |
| 6,104,343 A | 8/2000 | Brookner et al. | |
| 6,127,985 A | 10/2000 | Guler | |
| 6,166,705 A | 12/2000 | Mast et al. | |
| 6,181,280 B1 | 1/2001 | Kadambi et al. | |
| 6,184,832 B1 | 2/2001 | Geyh et al. | |
| 6,208,316 B1 | 3/2001 | Cahill | |
| 6,211,824 B1 | 4/2001 | Holden et al. | |
| 6,218,214 B1 | 4/2001 | Panchou et al. | |
| 6,222,493 B1 | 4/2001 | Caille et al. | |
| 6,225,695 B1 | 5/2001 | Chia et al. | |
| 6,252,542 B1 * | 6/2001 | Sikina | H01Q 3/267 342/174 |
| 6,297,775 B1 | 10/2001 | Haws et al. | |
| 6,388,620 B1 | 5/2002 | Bhattacharyya | |
| 6,424,313 B1 | 7/2002 | Navarro et al. | |
| 6,480,167 B2 | 11/2002 | Matthews | |
| 6,483,705 B2 | 11/2002 | Snyder et al. | |
| 6,611,180 B1 | 8/2003 | Puzella et al. | |
| 6,621,470 B1 | 9/2003 | Boeringer et al. | |
| 6,624,787 B2 | 9/2003 | Puzella et al. | |
| 6,661,376 B2 | 12/2003 | Maceo et al. | |
| 6,670,930 B2 | 12/2003 | Navarro | |
| 6,686,885 B1 | 2/2004 | Barkdoll et al. | |
| 6,703,976 B2 | 3/2004 | Jacomb-Hood et al. | |
| 6,711,814 B2 | 3/2004 | Barr et al. | |
| 6,731,189 B2 | 5/2004 | Puzella et al. | |
| 6,756,684 B2 | 6/2004 | Huang | |
| 6,856,210 B2 | 2/2005 | Zhu et al. | |
| 6,900,765 B2 | 5/2005 | Navarro et al. | |
| 6,943,300 B2 | 9/2005 | Ekeberg et al. | |
| 6,961,248 B2 | 11/2005 | Vincent et al. | |
| 6,995,322 B2 | 2/2006 | Chan et al. | |
| 7,030,712 B2 | 4/2006 | Brunette et al. | |
| 7,061,446 B1 | 6/2006 | Short, Jr. et al. | |
| 7,129,908 B2 | 10/2006 | Edward et al. | |
| 7,132,990 B2 | 11/2006 | Stenger et al. | |
| 7,180,745 B2 | 2/2007 | Mandel et al. | |
| 7,187,342 B2 | 3/2007 | Heisen et al. | |
| 7,298,235 B2 | 11/2007 | Hauhe et al. | |
| 7,336,727 B2 | 2/2008 | Mukkavilli et al. | |
| 7,348,932 B1 | 3/2008 | Puzella et al. | |
| 7,417,598 B2 | 8/2008 | Navarro et al. | |
| 7,443,354 B2 | 10/2008 | Navarro et al. | |
| 7,444,737 B2 | 11/2008 | Worl | |
| 7,489,283 B2 | 2/2009 | Ingram et al. | |
| 7,508,338 B2 | 3/2009 | Pluymers et al. | |
| 7,545,323 B2 | 6/2009 | Kalian et al. | |
| 7,570,209 B2 | 8/2009 | Shi et al. | |
| 7,597,534 B2 | 10/2009 | Hopkins | |
| 7,626,556 B1 | 12/2009 | Pluymers et al. | |
| 7,671,696 B1 | 3/2010 | Puzella et al. | |
| 7,885,348 B2 | 2/2011 | Li et al. | |
| 7,982,664 B1 * | 7/2011 | Uscinowicz | G01S 7/4004 342/165 |
| 8,154,452 B2 * | 4/2012 | Webb | H01Q 3/267 342/174 |
| 8,427,371 B2 | 4/2013 | Pozgay | |
| 2002/0169578 A1 | 11/2002 | Yang | |
| 2003/0160720 A1 * | 8/2003 | Maceo | G01S 13/4463 342/373 |
| 2003/0184473 A1 | 10/2003 | Yu | |
| 2004/0070533 A1 * | 4/2004 | Azuma | H01Q 3/267 342/174 |
| 2005/0110681 A1 | 5/2005 | Londre | |
| 2005/0151215 A1 | 7/2005 | Hauhe et al. | |
| 2006/0268518 A1 | 11/2006 | Edward et al. | |
| 2007/0018882 A1 | 1/2007 | Manoogian et al. | |
| 2007/0152882 A1 | 7/2007 | Hash et al. | |
| 2008/0106467 A1 | 5/2008 | Navarro et al. | |
| 2008/0106482 A1 | 5/2008 | Cherrette et al. | |
| 2008/0150832 A1 | 6/2008 | Ingram et al. | |
| 2008/0316139 A1 | 12/2008 | Blaser et al. | |
| 2010/0245179 A1 | 9/2010 | Puzella et al. | |
| 2010/0259445 A1 | 10/2010 | Corman et al. | |
| 2011/0133982 A1 * | 6/2011 | Goshen | G01S 7/4004 342/174 |

FOREIGN PATENT DOCUMENTS

| | | |
|---|---|---|
| EP | 1 436 859 B1 | 8/2007 |
| EP | 1 978 597 A1 | 10/2008 |
| JP | 4-122107 A | 4/1992 |
| JP | 06-097710 | 4/1994 |
| JP | 07-212125 | 8/1995 |
| JP | 2000-138525 A | 5/2000 |
| JP | 2003 179429 A | 6/2003 |
| JP | 2005 505963 | 2/2005 |
| KR | 1020010079872 A | 8/2001 |
| WO | WO 98/26642 | 6/1998 |
| WO | WO 99/66594 | 12/1999 |
| WO | WO 01/20720 A1 | 3/2001 |
| WO | WO 01/41257 A1 | 6/2001 |
| WO | WO 03/003031 A1 | 4/2003 |
| WO | WO 2007/136941 A2 | 11/2007 |
| WO | WO 2007/136941 A3 | 11/2007 |
| WO | WO 2008/010851 A2 | 1/2008 |
| WO | WO 2008/010851 A3 | 1/2008 |
| WO | WO 2008/036469 A1 | 3/2008 |

OTHER PUBLICATIONS

Office Action dated Aug. 15, 2014 for U.S. Appl. No. 13/267,193, filed Oct. 6, 2011 20 pages.

PCT International Preliminary Report on Patentability for PCT/US2012/052999 dated Apr. 8, 2014.

Response to Taiwanese Office Action (and Translation) as filed on Oct. 5, 2015 for Appl. No. 101132744; 72 pages.

Response to Rule 161(1) and 162 EPC dated May 24, 2014 as filed on Nov. 26, 2014 for Application No. 12759566.8 14 pages.

Examination Report dated Nov. 28, 2014 for Application No. 2012/319035 3 pages.

(56) References Cited

OTHER PUBLICATIONS

Response to Examination Report in the Australian Patent Office as filed on May 11, 2015 for Appl. No. 2012/319035.
Response to Office Action dated Mar. 12, 2015 for U.S. Appl. No. 13/267,193, filed Oct. 6, 2011.
Notice of Allowance dated Jul. 17, 2015 for U.S. Appl. No. 13/267,193.
Bash et al,; "Improving Heat Transfer From a Flip-Chip Package," Technology Industry; Email Alert RSS Feed; Hewlett-Packard Journal, Aug. 1997; 3 pages.
Carter, "'Fuzz Button' Interconnects at Microwave and MM-Wave Frequencies;" IEEE Seminar; London, UK; Mar. 1-6, 2000; 7 sheets.
Jerinic, et al.; "X-Band "Tile" Array for Mobile Radar;" Internal Raytheon Company publication; Spring 2003; 4 pages.
Marsh et al.; "5.4 Watt GaAs MESFET MMIC for Phased Array Radar Systems;" 1997 Workshop on High Performance Electron Devices for Microwave and Optoelectronic Applications, Nov. 24-25, 1997; pp. 169-174.
Puzella, et al.; "Digital Subarray for Large Apertures;" slide presentation; internal Raytheon Company publication; Sep. 14, 2004; pp. 1-22.
Div. Application (with translation of amended claims) as filed on Dec. 1, 2008 in Korean Intellectual Property office and assigned App. No. 10-2008-7089396.
Decision of Rejection dated Jul. 30, 2008 from KR Pat. App. No. 10-2004-7003900.
Notice of Trial Decision dated Mar. 23, 2010 from KR Pat. App. No. 10-2004-7003900.
EP Search Report for 06021905.2; dated Feb. 9, 2007; 8 pages.
European Office Action dated Nov. 3, 2005 from EP Pat. App. No. 02800372.1.
Response to European Office Action filed Jan. 12, 2007 from EP Pat. App. No. 02800372.1.
European Office Action dated Oct. 18, 2007 from EPO Pat. App. No. 06021905.2.
Response to European Office Action dated Oct. 18, 2007 filed in the EPO on Aug. 11, 2008 from EP Pat. App. No. 06021905.2.
Response to European Office Action dated Mar. 19, 2009 filed in the EPO on Nov. 19, 2009 from EP Pat. App. No. 06021905.2.
European Office Action dated Feb. 18, 2010 from EPO Pat. App. No. 06021905.2.
Notice of Allowance dated Feb. 2, 2007 from EP Pat. App. No. 02800372.1.
Korean Office Action dated Oct. 31, 2007 from KR Pat. App. No. 10-2004-7003900.
Response to Korean Office Action filed Mar. 26, 2008 from KR Pat. App. No. 10-2004-7003900.
Korean Office Action dated Feb. 25, 2009 from KR Pat. App. No. 10-2008-7029396.
Korean Office Action dated Nov. 27, 2009 from KR Pat. App. No. 10-2008-7029396.
Japanese Office Action dated Mar. 7, 2007 from JP Pat. App. No. 2003-533378.
Japanese Office Action dated Feb. 15, 2008 from JP Pat. App. No. 2003-533378.
Japanese Office Action dated Feb. 18, 2009 from JP Pat. App. No. 2003-533378.
Response to Japanese Office Action filed Jul. 5, 2007 from JP App. No. 2003-533378.
Response to Japanese Office Action filed Jun. 19, 2008 from App JP App. No. 2003-533378.
Office Action dated Jun. 11, 2010 from U.S. Appl. No. 12/694,450.
Response to Office Action of Jun. 11, 2010 from U.S. Appl. No. 12/694,450.
Notice of Allowance dated Nov. 3, 2010 from U.S. Appl. No. 12/482,061.
Office action dated Dec. 1, 2010 from U.S. Appl. No. 12/694,450.
PCT International Preliminary Examination Report and Written Opinion of the ISA for PCT/US2002/30677 dated Nov. 27, 2003; 10 pages.
PCT Search Report mailed on Dec. 19, 2007 for PCT Pat. App. No. PCT/US2007/074795 filed on Jul. 31, 2007.
PCT Written Opinion mailed on Dec. 19, 2007 for PCT Pat. App. No. PCT/US2007/074795 filed on Jul. 31, 2007.
PCT International Preliminary Examination Report mailed on Apr. 2, 2009 for PCT Pat. App. No. PCT/US2007/074795 filed on Jul. 31, 2007.
U.S. Appl. No. 12/694,450, filed Jan. 27, 2010, file through Oct. 6, 2011—Part A, 224 pages.
U.S. Appl. No. 12/694,450, filed Jan. 27, 2010, file through Oct. 6, 2011—Part B, 447 pages.
U.S. Appl. No. 12/694,450, filed Jan. 27, 2010, file through Oct. 6, 2011—Part C, 499 pages.
U.S. Appl. No. 12/694,450, filed Jan. 27, 2010, file through Oct. 6, 2011—Part D, 472 pages.
U.S. Appl. No. 12/694,450, filed Jan. 27, 2010, file through Oct. 6, 2011—Part E, 373 pages.
PCT Search Report of the ISA dated Jun. 20, 2011 for PCT Pat. App. No. PCT/US2011/028063; 5 pages.
PCT Written Opinion of the ISA dated Jun. 20, 2011 for PCT Pat. App. No. PCT/US2011/028063; 6 pages.
U.S. Appl. No. 12/484,626, filed Jun. 15, 2009, file through Oct. 6, 2011, Part One, 169 pages.
U.S. Appl. No. 12/484,626, filed Jun. 15, 2009, file through Oct. 6, 2011, Part Two, 435 pages.
U.S. Appl. No. 12/484,626, filed Jun. 15, 2009, file through Oct. 6, 2011, Part Three, 218 pages.
U.S. Appl. No. 12/484,626, filed Jun. 15, 2009, file through Oct. 6, 2011, Part Four, 218 pages.
U.S. Appl. No. 12/484,626, filed Jun. 15, 2009, file through Oct. 6, 2011, Part Five, 215 pages.
U.S. Appl. No. 10/441,366, filed May 20, 2003, file through Oct. 6, 2011, 91 pages.
U.S. Appl. No. 12/533,178, filed Jul. 31, 2009, file through Oct. 6, 2011, 183 pages.
U.S. Appl. No. 12/533,185, filed Jul. 31, 2009, file through Oct. 6, 2011, 197 pages.
International Search Report of the ISA for PCT/US2012/052999 dated Dec. 6, 2012.
Written Opinion of the ISA for PCT/US2012/052999 dated Dec. 6, 2012.
Office Action dated Mar. 12, 2014 for U.S. Appl. No. 13/267,193.
International Preliminary Report on Patentability for Pat. Appl. No. PCT/US2011/028063.
EPO Rule 161 Communication dated Nov. 11, 2012 for Pat. Appl. No. 11711185.6.
Response to EPO Rule 161 Communication as filed on May 27, 2013 for Pat. Appl. No. 11711185.6.
Australian Office Action dated Oct. 4, 2013 for Pat. Appl. No. 2011238848.
Response to Australian Office Action as filed on Dec. 9, 2013 for Pat. Appl. No. 2011238848.
U.S. Appl. No. 12/757,371, filed Apr. 9, 2010; Part 1 of 11; 400 pages.
U.S. Appl. No. 12/757,371, filed Apr. 9, 2010; Part 2 of 11; 400 pages.
U.S. Appl. No. 12/757,371, filed Apr. 9, 2010; Part 3 of 11; 400 pages.
U.S. Appl. No. 12/757,371, filed Apr. 9, 2010; Part 4 of 11; 400 pages.
U.S. Appl. No. 12/757,371, filed Apr. 9, 2010; Part 5 of 11; 400 pages.
U.S. Appl. No. 12/757,371, filed Apr. 9, 2010; Part 6 of 11; 400 pages.
U.S. Appl. No. 12/757,371, filed Apr. 9, 2010; Part 7 of 11; 200 pages.
U.S. Appl. No. 12/757,371, filed Apr. 9, 2010; Part 8 of 11; 200 pages.
U.S. Appl. No. 12/757,371, filed Apr. 9, 2010; Part 9 of 11; 200 pages.
U.S. Appl. No. 12/757,371, filed Apr. 9, 2010; Part 10 of 11; 200 pages.
U.S. Appl. No. 12/757,371, filed Apr. 9, 2010; Part 11 of 11; 162 pages.
Taiwanese Office Action (and Translation) dated Jul. 3, 2015 for Appl. No. 101132744.
Examination Report for Gulf Cooperation Application No. GC 2012-22309 dated Mar. 24, 2016; 3 pages.

* cited by examiner

CALIBRATION SYSTEM AND TECHNIQUE FOR A SCALABLE, ANALOG MONOPULSE NETWORK

CROSS REFERENCE TO RELATED APPLICATIONS

This application is a continuation of U.S. patent application Ser. No. 13/267,193 entitled "SCALABLE, ANALOG MONOPULSE NETWORK," filed on Oct. 6, 2011.

FIELD OF THE INVENTION

The concepts and systems described herein relate generally to phased array antennas and more particularly to a calibration technique for Active Electronically Steered Arrays (AESAs).

BACKGROUND

As is known in the art, phased array antennas include a plurality of antenna elements spaced apart from each other by known distances coupled through a plurality of phase shifter circuits to either or both of a transmitter or receiver.

As is also known, phased array antenna systems produce a beam of radio frequency energy (RF) and direct such beam along a selected direction by controlling the phase (via the phase shifter circuitry) of the RF energy passing between the transmitter or receiver and the array of antenna elements. In an electronically scanned phased array, the phase of the phase shifter circuits (and thus the beam direction) is selected by sending a control signal or word to each of the phase shifter sections. The control word is typically a digital signal representative of a desired phase shift, as well as a desired attenuation level and other control data.

Phased array antennas are often used in both defense and commercial electronic systems. For example, active electronically scanned arrays (AESAs) are in demand for a wide range of defense and commercial electronic systems such as radar surveillance, terrestrial and satellite communications, mobile telephony, navigation, identification, and electronic counter measures. Such systems are often used in radar for land base, ship and airborne radar systems and satellite communications systems. Thus, the systems are often deployed on a single structure such as a ship, aircraft, missile system, missile platform, satellite, or building where a limited amount of space is available.

AESAs offer numerous performance benefits over passive scanned arrays as well as mechanically steered apertures. However, the costs associated with deploying AESAs can limit their use to specialized military systems. An order of magnitude reduction in array cost could enable widespread AESA insertion into military and commercial systems for radar, communication, and electronic warfare (EW) applications. The performance and reliability benefits of AESA architectures could extend to a variety of platforms, including ships, aircraft, satellites, missiles, and submarines. Increasing modularity, reducing fabrication costs and increasing the quantity of components being manufactured can drive down the unit costs of the components and thus the cost of the AESAs.

With the desire to reduce the cost of array antennas, and in particular the cost of array antennas having relatively large apertures, it has become common to develop the antenna aperture as an array of active sub-array apertures. These sub-arrays typically have their own internal RF power dividers, driver amplifiers, time delay units, logic distribution networks, DC power distribution networks, DC/DC converters, and accessible ports for RF, logic, DC power, and thermal management interfaces. It would desirable if each of the sub-arrays could be manufactured the same and be used interchangeably in the fabrication of the complete array. But when the aperture is formed from sub-arrays, it has, heretofore, lacked flexibility because the RF distribution networks required for receive beam formation and exciter output distribution are hardwired into the aperture backplane and are thus position dependent. Thus, typical AESA apertures are not configured such that the sub-arrays are interchangeable.

To further complicate the problem, a tracking radar having a highly directive antenna pattern (narrow main beam) seeks to keep the antenna electrical boresite aligned with a target of interest. The method typically used to track targets is monopulse beamforming where the angular location of a target is obtained by comparison of signals received simultaneously via three antenna patterns (called the "sum pattern", "elevation monopulse pattern" and "azimuth monopulse pattern"; typically the monopulse patterns are referred to more simply as the "El pattern" and "Az pattern").

Two conventional approaches for AESA monopulse are: (1) analog beamforming; and (2) combined analog-digital beamforming. In the analog beamforming approach, an analog RF feed network combines multiple AESA transmit/receive (T/R) channels into sub-arrays; then sub-arrays are combined via unique RF feed networks which couple and weight sub-array RF receive signals to produce an array-level monopulse pattern in elevation and azimuth angle.

In the combined analog-digital beamforming approach, an analog RF feed network combines multiple AESA T/R channels into sub-arrays in the same manner as the all-analog approach. Analog to Digital (A/D) converters at each sub-array produce digital signals that are then combined to form the final array-level monopulse pattern in elevation and azimuth angle.

Thus, elevation and azimuth monopulse patterns can be generated with analog beamforming techniques, digital beamforming techniques, or a combination of both analog and digital beamforming.

To ensure accurate beamsteering in a phased array, it is necessary to calibrate the array by determining path length differences in each RF signal path leading to an antenna element and adjusting for such differences.

In a planar AESA, three-channel monopulse (receive sum channel, receive delta elevation channel and receive delta azimuth channel) calibration is typically accomplished using a time-intensive process which uses waveguide-probe measurements in a planar near-field range. Not only are conventional calibration techniques time-consuming, such approaches sacrifice pattern accuracy because calibration is performed with only one transmit/receive (T/R) channel on at a time. That is, the receive sum, receive delta elevation and receive delta azimuth channels are all calibrated in the sub-array near-field; therefore requiring that the waveguide probe move from T/R channel to T/R channel which is time-consuming and thus expensive to perform on a large AESA. This leads to a trade-off in near-field calibration time versus calibration accuracy. As described herein, calibration accuracy relates to the receive sum channel, receive delta elevation channel and receive delta azimuth channel antenna requirements for 1) sidelobe level, 2) beam pointing accuracy and 3) delta pattern null depth (a significant driver of monopulse slope).

As noted above, the importance of monopulse beamforming in radar performance is well-known.

Elevation and azimuth monopulse patterns can be generated with analog beamforming techniques or digital beamforming (prior to receiver matched filter processing) technique. Alternatively a combination of both analog and digital beamforming can be used. A brief description of each monopulse beamforming approach is given below.

When analog beamforming is used, the traditional approach is to design and fabricate a unique corporate RF feed network for each sub-array. However, any change to the AESA active aperture dimension, sub-array dimension or sidelobe performance specification requires a re-design of the beamforming network. Typically, a planar near-field scanner is used for three-channel monopulse calibration where a sequential set of measurements are made with one T/R channel commanded on at a time.

When all-digital beamforming is used, digital beamforming at the T/R element level provides design invariance to a change in AESA active aperture dimension, sub-array dimension or sidelobe performance. A planar near-field scanner could be used for calibration but the calibration needs to be performed only once (per frequency) since the RF signal is immediately digitized at the T/R channel level. Presently, digital beamforming at the T/R element level above L-Band is cost prohibitive.

Therefore, it is highly desired to have a calibration technique that reduces antenna calibration time while maximizing AESA monopulse pattern performance.

An AESA sub-array typically has dozens to hundreds of T/R channels. Calibration of the monopulse channels using conventional approaches is, therefore, a compromise between pattern accuracy (e.g., monopulse null/slope, sidelobes, beam-pointing accuracy) and near-field test time.

With respect to monopulse pattern accuracy, to achieve the highest accuracy for the receive delta elevation channel and receive delta azimuth channel, one measures the RF signal path through the receive delta elevation channel (for delta elevation channel calibration) and receive delta azimuth channel (for delta azimuth channel calibration). This must be done for all receive sum T/R channels in the panel (or sub-array). Then for each of the above-described RF measurements, all combinations of digital attenuation and digital phase state are measured through the receive delta elevation channel and receive delta azimuth channel respectively. Measuring all T/R channel states minimizes amplitude and phase errors, but it is also the most time-consuming.

With respect to test time, to achieve a satisfactory AESA calibration test time for the receive delta elevation channel and receive delta azimuth channel, one measures the RF path signal through the receive delta elevation channel (and receive delta azimuth channel) for only one (or several) receive sum T/R channels. For each of the above-described RF measurements, several combinations of digital attenuation and digital phase state are measured through the receive delta elevation channel (and receive delta azimuth channel). Measuring several T/R channel states, instead of all states, results in higher amplitude and phase errors, but it is also reduces test time.

Long near-field test times add considerable labor costs to an AESA; but, AESA monopulse tracking accuracy is directly dependent on the monopulse null/slope, beam-pointing accuracy and relatively low sidelobes (compared to the receive sum channel sidelobes), which require a more complete set of near-field measurements that reduce residual errors in amplitude and phase due to the digital attenuator and phase shifter at the T/R channel level.

It would, therefore, be desirable to provide an AESA calibration technique that simultaneously reduces near-field calibration time and reduces (or ideally minimizes) errors in receive delta elevation and delta azimuth channels.

SUMMARY

The scalable, analog monopulse network calibration technique described herein decreases calibration time for a three-channel monopulse active electronically scanned array (AESA) while maintaining or enhancing monopulse pattern accuracy.

The calibration technique described herein is capable of calibrating an AESA implemented with a scalable, analog monopulse network of the type described in U.S. application Ser. No. 13/267,193 filed Oct. 6, 2012 assigned to the assignee of the present application and thus the calibration technique is sometimes referred to herein as the scalable, analog, monopulse network calibration technique.

The scalable, analog monopulse network calibration technique described herein solves the aforementioned problems of planar near-field scan time versus residual errors by using a combined approach of near-field and far-field data collection (i.e. the calibration technique uses both a near-field data collection- or scan-technique and a far field data collection technique). The result is a calibration technique which provides a significant decrease in overall near-field test time while also providing excellent monopulse pattern performance. The scalable, analog monopulse network calibration technique is a two part process comprising a receive sum channel calibration process and a receive delta elevation and azimuth channel calibration process.

During the receive sum channel part of the process, a receive (and transmit) sum channel is calibrated using a planar near-field scan. In the near-field scan portion of the calibration process, a single T/R channel is turned on in receive mode (all other T/R channels are powered off or in "stand-by" mode) and RF measurements are made using a waveguide probe as the digital attenuation and phase (i.e., a "beam action") of the given T/R channel is cycled. This measurement is done at each frequency of interest.

In the far-field scan portion of the calibration process, the AESA is moved to the far-field of the sub-array and a low gain probe is positioned at the center of each sub-array. This can be done in either an anechoic chamber or in an outside test range. Element level calibration is sequentially performed by electronically turning each element (of the given sub-array) on and measuring signals at sum channel output port at a number of different amplitude and phase states. When the measurement is complete, the element is turned off and the next element is electronically turned on while the probe stays positioned at the center of the sub-array. When all the elements of the given sub-array have been electronically measured, the low gain probe is moved to the center of the next sub-array and the element level measurement process is repeated.

After the receive sum channel calibration is completed the receive delta elevation channel and receive delta azimuth channel are calibrated in the far-field of the monopulse channel sub-array. In this portion of the calibration process, an RF probe is centered on a given panel, the receive sum calibration is uploaded to the panel, the entire panel is turned on in receive mode (all other panels are turned off or placed in a "stand-by" mode) and RF measurements are made at the delta elevation and delta azimuth output ports. After a set of measurements are made, the panel is turned off and the next panel is turned on as the probe moves to the center of the next panel and the measurement process is repeated.

The scalable, analog monopulse network calibration technique reduces AESA calibration time since the monopulse channels are calibrated in the far-field of a panel (or sub-array) thus significantly reducing probe movement. And since an entire panel (or sub-array) is on during receive delta elevation channel and receive delta azimuth channel calibration, all digital attenuation and digital phase error contributions from each T/R channel associated with the panel (or sub-array) is measured for the receive delta elevation channel and receive delta azimuth channel.

In accordance with a further aspect of the concepts and techniques described herein, a scalable, analog monopulse network calibration technique includes a receive/transmit sum channel calibration followed by a receive delta EL/delta AZ channel calibration. The receive sum channel (and transmit channel) is calibrated using a traditional planar near-field scan approach. That is, a single T/R channel is turned on in receive mode (all other T/R channels are off or in stand-by mode) and the waveguide probe makes RF measurements as the digital attenuation and phase (i.e., a beam action) of the given T/R channel is cycled; this measurement is done at each frequency of interest.

After the receive sum channel calibration is completed, the receive delta elevation channel and receive delta azimuth channel are calibrated in the far-field. That is, the entire AESA is moved back a distance corresponding to the far-field of a panel (or sub array). The waveguide probe is then centered on the given panel, receive sum calibration values are uploaded to the panel (i.e. the sum channel calibration values are uploaded to controller U1 in the active monopulse board; it should be noted that the calibration values to be uploaded to controllers U2-U5 will be determined in the far-field part of the calibration), the entire panel is turned on in receive mode (all other panels off or in stand-by mode) and RF measurements are made. After a set of measurements are made the panel is turned off and the next panel is turned on as the waveguide probe moves to the center of the next panel and the measurement process is repeated.

In summary, the calibration technique described herein can be implemented on a far-field range or compact range; the T/R channel measurements are cycled as in a traditional near-field measurement for the receive sum channel calibration; the technique is invariant to the receive sum channel amplitude weighting; the calibration technique is invariant to the to the size of the AESA. The far-field distance for monopulse channel calibration is based upon the sub-array overall physical size. For example, in one case the far-field distance of a 128 T/R channel panel array operating in the range of 10 GHz was 16.9 ft.

In accordance with a further aspect of the concepts, systems and techniques described herein, in an anechoic chamber (or outside test range), receive or transmit sum channel calibration values are computed using a near-field measurement technique and uploaded to a sub-array of an AESA comprised of a plurality of subarrays. The AESA is moved to the far-field of the sub-array and a low gain probe is positioned at the center of each sub-array. Element level calibration is sequentially performed by electronically turning each element (of the given sub-array) on and measuring a number of amplitude and phase states; when the measurement is complete, the element is turned off and the next element is electronically turned on—the probe stays positioned at the center of the sub-array. When all the elements of the given sub-array have been electronically measured, the low gain probe moves to the center of the next sub-array and repeats the element level measurement process. In this manner, the number of probe movements for element level calibration is reduced by approximately an order of magnitude—the scan time savings increases as the size of the AESA increases in size. For testing on an outside range, the probe may not need to be moved at all if the probe can be place in the far-field of the entire AESA.

With this particular technique, a scalable analog monopulse calibration technique which reduces probe scan time by an order of magnitude compared with conventional calibration techniques and reduces monopulse channel amplitude and phase errors for active electronically scanned arrays (AESA) is provided. The calibration technique has been developed for AESA's utilizing sub-array electronic amplitude and/or phase control on the monopulse channels. The total number of probe movements to perform the monopulse channel calibration is equal to the number of probe movements for the element level calibration: the greater the number of AESA elements, the greater the savings in probe scan time. It has been discovered that for an AESA of 10,000 elements, there is a 20 minute per scan savings and a savings greater than 40 minute per scan for an AESA of 20,000, or more, elements. In addition, the measurements can be performed in an anechoic chamber or on an outside range.

For AESA's implementing sub-array electronic amplitude and/or phase control on the monopulse channels, monopulse calibration is performed by again positioning the waveguide probe at the center of each sub-array. The receive sum channel calibration at boresite is uploaded for each element in the sub-array and all the elements for that sub-array are turned on; then, the electronic amplitude and/or phase control states of the monopulse channel are measured. The low gain probe then moves to the center of the next sub-array and the receive sum channel calibration at boresite is uploaded for each element for the sub-array; electronic amplitude and/or phase control states of the monopulse channel are measured.

Finally, regardless of whether an AESA uses amplitude and/or phase control on the monopulse channels, there is a great benefit to reducing scan test time by performing element by element calibration in the far-field of an AESA element.

The scalable, analog monopulse network calibration technique is thus capable of being used with any AESA comprised of sub-arrays. In one exemplary embodiment described herein, the calibration technique was used on an AESA comprising 32 panels with each panel having 128 T/R channels and employing a scalable, analog monopulse network. The calibration technique innovations include, but are not limited to: (a) the technique can be implemented on a far-field range or compact range; the T/R channel measurements would be cycled as in a traditional near-field measurement for the receive sum channel calibration; (b) the technique is invariant to the receive sum channel amplitude weighting; (c) the technique is invariant to the size of the AESA being calibrated (the far-field distance for monopulse channel calibration is based upon the sub-array overall physical size); (d) the calibration technique results in an AESA having reduced monopulse channel average power sidelobe level (the affect of random errors is reduced by a factor of N or 10*log(N) dB); and (e) the calibration technique results in an AESA having reduced sum channel, delta elevation channel and delta azimuth channel noise figure.

BRIEF DESCRIPTION OF THE DRAWINGS

The foregoing and other objects, features and advantages of the concepts, systems and techniques described herein will be apparent from the following description of particular exemplary embodiments as illustrated in the accompanying drawings in which like reference characters refer to the same parts throughout the different views. The drawings are not necessarily to scale, emphasis instead being placed upon illustrating the principles of the concepts, systems and techniques described herein.

DETAILED DESCRIPTION

Figure 2:
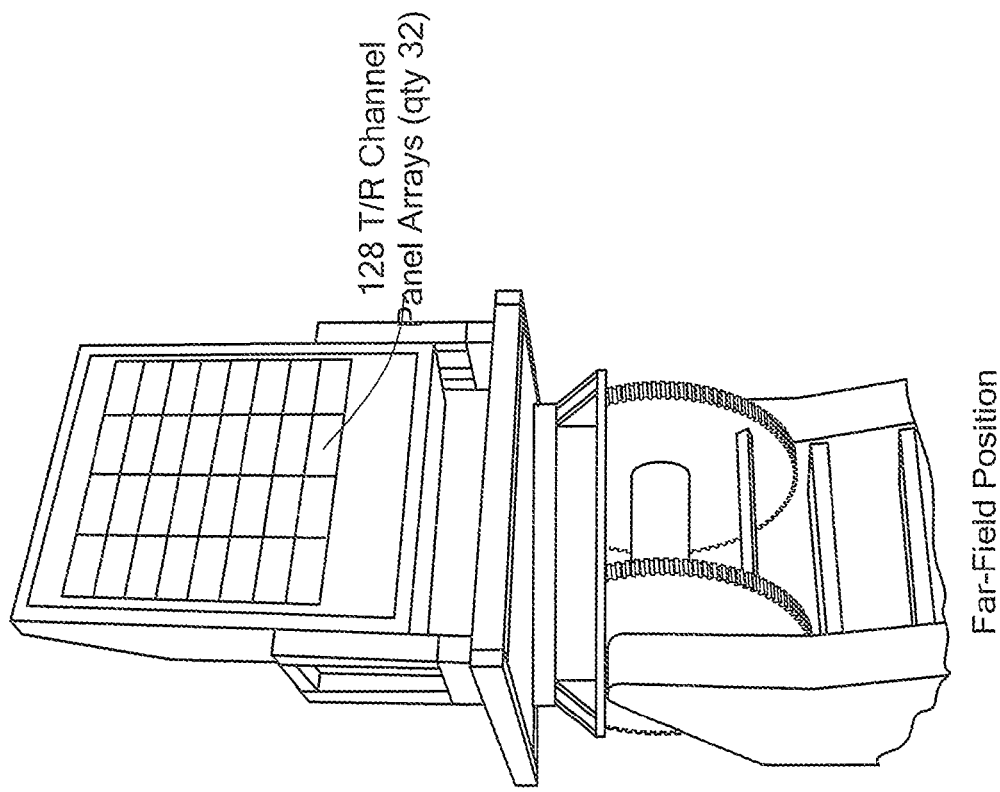
FIG. 2 is an isometric front view of the AESA of FIG. 1 in a far-field position during calibration.

Embodiments of the present system are directed toward an apparatus and associated techniques for calibrating an active electronically steered array (AESA) and in particular for calibrating an AESA having a sub-array architecture and a scalable, analog monopulse network.

Before describing a technique for calibrating an AESA having a scalable, analog monopulse network, some introductory concepts and terminology are explained. It should first be appreciated that reference is sometimes made herein to calibration of phased arrays used in defense applications. It should, of course, be appreciated that the calibration technique described herein can be used in a wide range of defense and commercial electronic systems including, but not limited to: radar, terrestrial and satellite communications, mobile telephony, navigation, identification and electronic countermeasures. It should also be appreciated that the monopulse calibration technique described herein has at least two benefits: (1) a reduction of probe scan time; and a reduction of monopulse network amplitude and phase errors (which consequently leads to a reduction of amplitude and phase errors in an AESA). As described herein, calibration accuracy relates to the receive delta elevation channel and receive delta azimuth channel antenna requirements for 1) sidelobe level, 2) beam pointing accuracy and 3) monopulse slope (measure of the antenna pattern null depth). The calibration process described herein applies to an AESA which includes scalable, analog monopulse network.

The calibration technique described herein is a combination of both near-field and far-field data collection. Near-field data collection is characterized by a waveguide probe positioned at the geometric center of a radiator at a distance of at least three free space wavelengths from the plane of the array radiator. Far-field data collection is characterized by a waveguide probe positioned at the geometric center of a radiator at a distance of at least $2*D^2/\lambda$ where D is the maximum dimension in the plane of the radiator and $\lambda$ is the free space wavelength.

Waveguide Probe

An additional benefit of moving the AESA to the far-field can be realized if the AESA sub-array is in the far-field. Monopulse beamforming for the scalable, analog monopulse system is done at the sub-array level; therefore, root-mean-square (RMS) phase and amplitude errors for the given monopulse channel are reduced if all of receive channels of the sub-array are on during calibration of the monopulse channel, with the receive channel element-calibrated amplitude and phase values loaded into each T/R Channel controller.

The scalable analog monopulse calibration technique described herein results in a reduction in monopulse network amplitude and phase errors. The calibration technique can be practically implemented in an AESA having amplitude and/or phase control in the monopulse channel using either of the following calibration techniques.

Combined near-field and far-field calibration technique. The first calibration technique combines near-field and far-field data collection; this technique was used to generate the monopulse patterns shown in FIGS. 4-11. In this technique, transmit and receive sum port calibration is performed in the near-field with a waveguide probe and monopulse calibration is performed in the far-field using a waveguide probe.

Far-Field only calibration technique. The second calibration technique is a far-field only data collection and calibration process performed in an anechoic range or outdoor range using a waveguide probe. In this technique, transmit and receive sum port calibration is performed in the far-field and monopulse calibration is performed in the far-field.

The Far-Field only calibration technique is the fastest approach since waveguide probe movements are reduced for transmit and receive sum port calibration as well as monopulse calibration.

Figure 1:
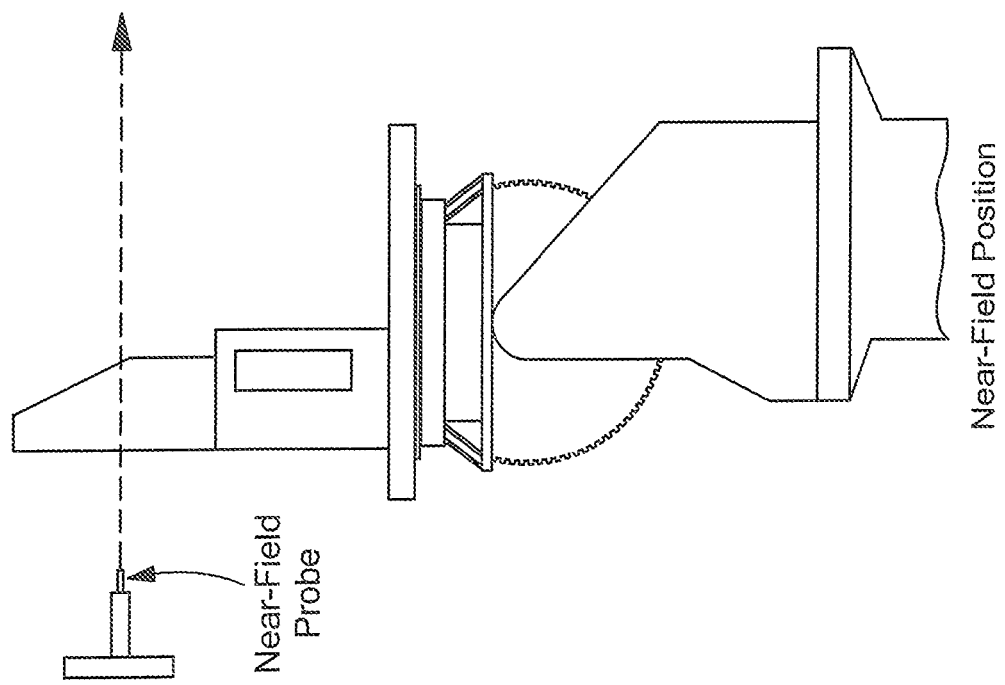
FIG. 1 is a side view of an exemplary active electronically steered array (AESA) having a waveguide probe disposed thereby.

Referring now to FIGS. 1 and 2, in one exemplary embodiment, the scalable, analog monopulse network calibration technique was used to calibrate a 4096 T/R channel X Band AESA shown in FIGS. 1 and 2. The AESA face is comprised of thirty-two (32) panel arrays with each panel array having one hundred twenty eight (128) T/R channels. FIG. 1 shows the waveguide probe in the near-field of the AESA while FIG. 2 shows the AESA in moved back such that the 128 channel panel array (or sub-array) is in the far-field.

Figure 3:
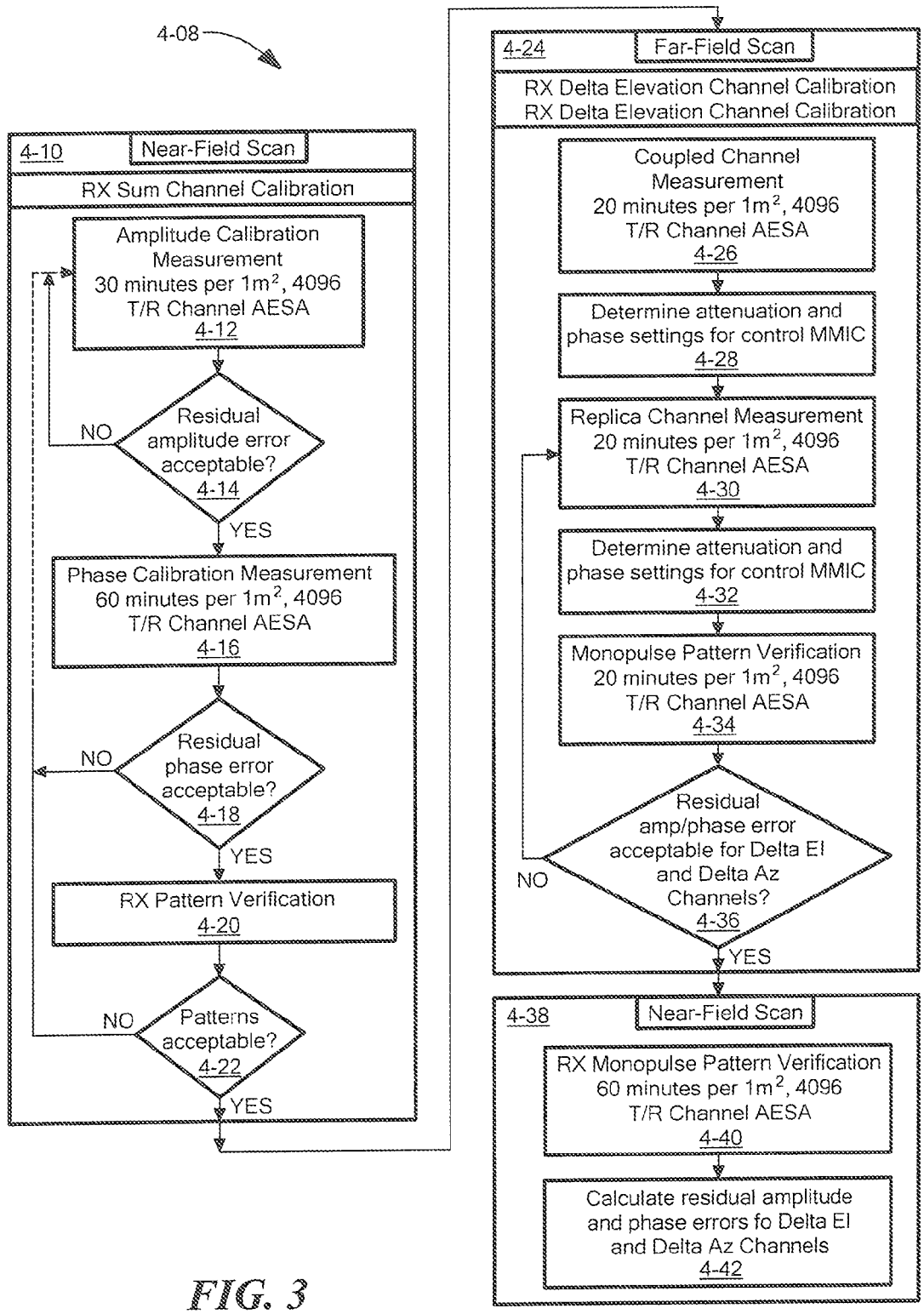
FIG. 3 is a flow diagram of a technique for calibrating an AESA having analog monopulse network.
Figure 4:
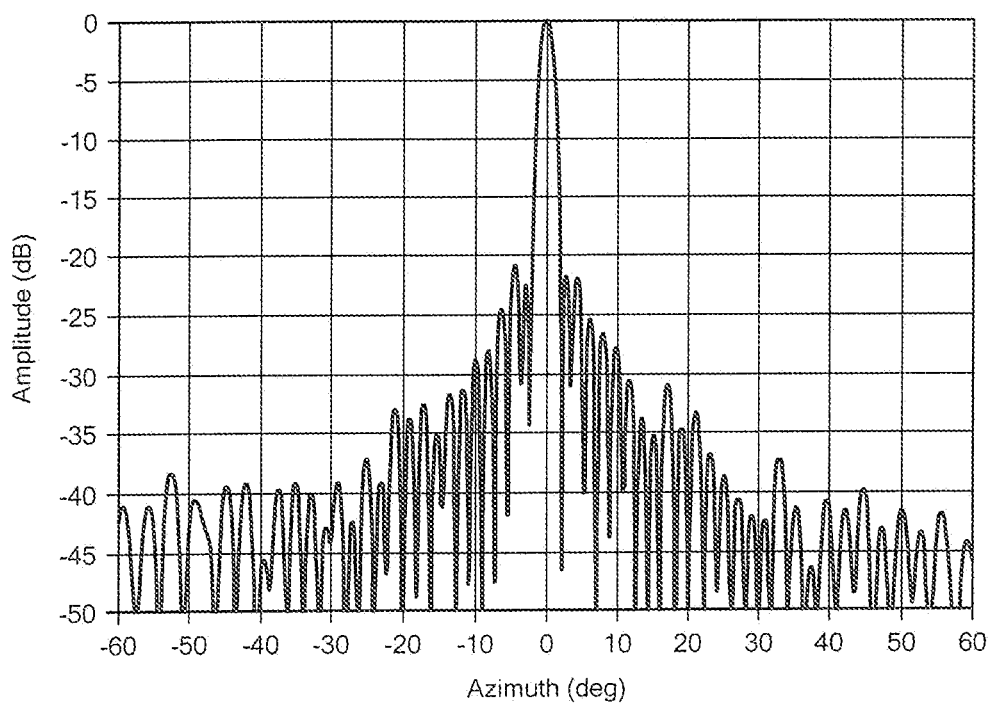
FIG. 4 is a plot of amplitude vs. azimuth angle for a receive sum pattern measured at a frequency of 9.3 GHz.
Figure 5:
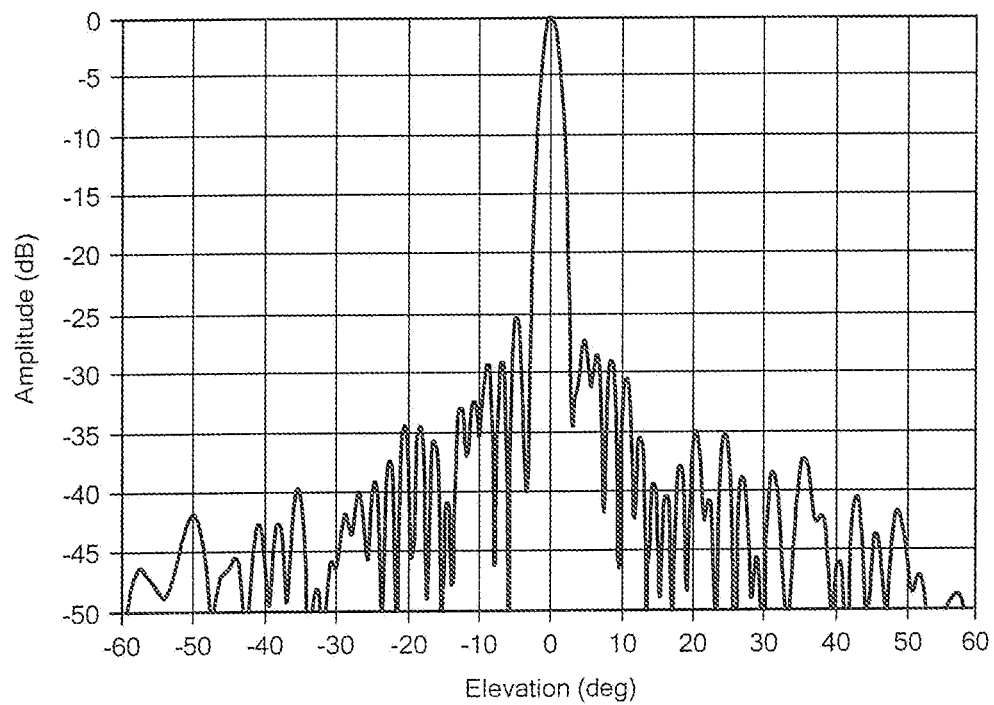
FIG. 5 is a plot of amplitude vs. elevation angle for a receive sum pattern measured at a frequency of 9.3 GHz.
Figure 6:
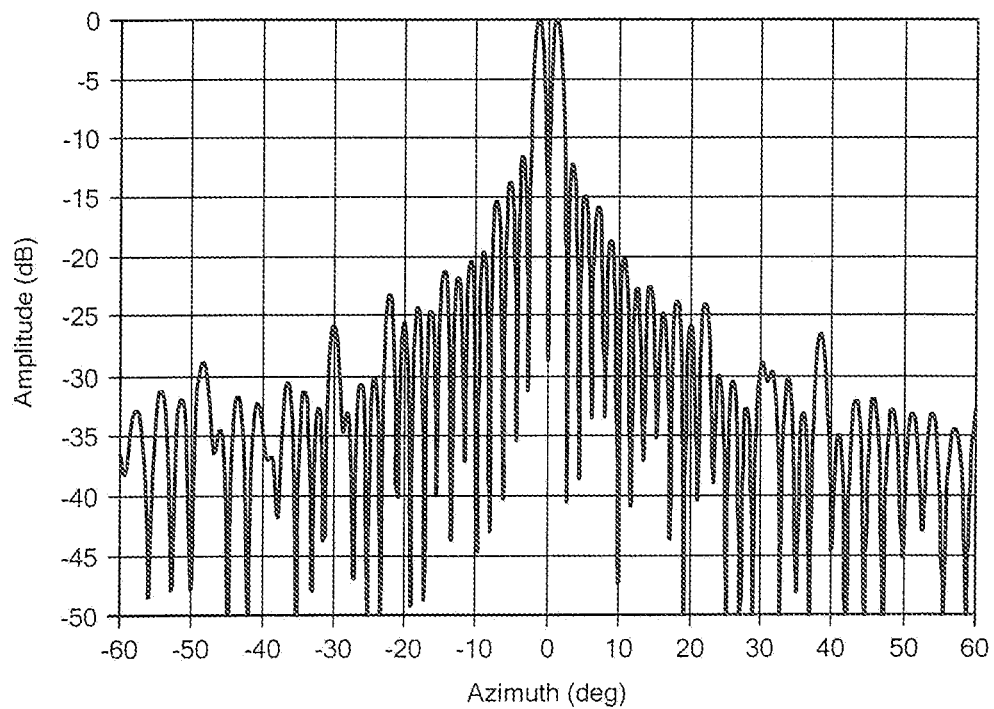
FIG. 6 is a plot of amplitude vs. azimuth angle for a receive delta azimuth pattern measured at a frequency of 9.3 GHz.
Figure 7:
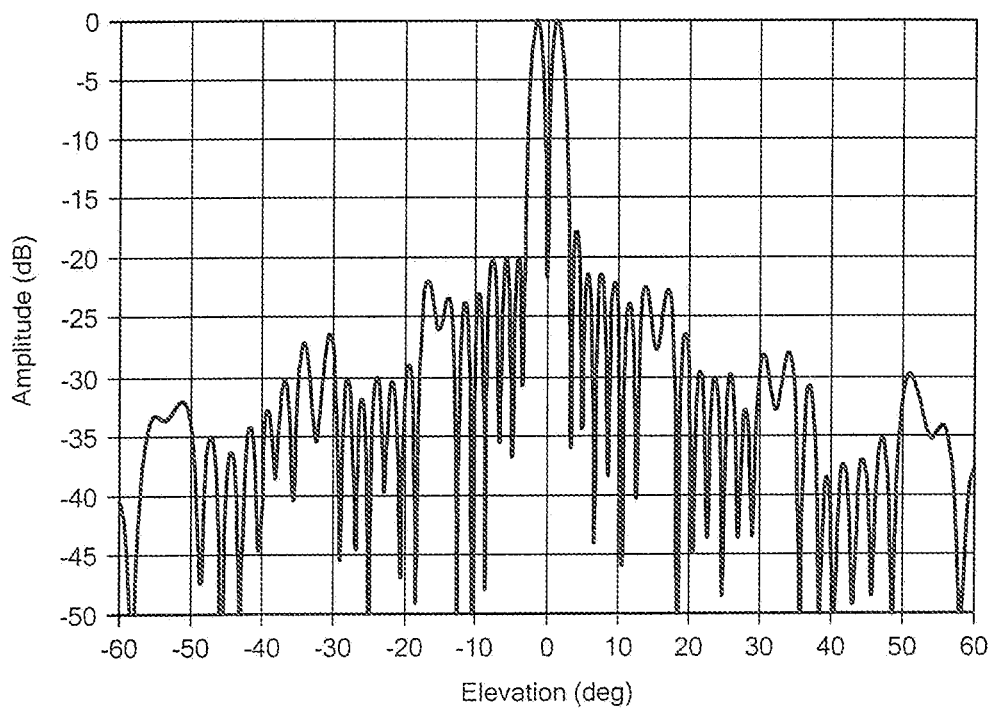
FIG. 7 is a plot of amplitude vs. elevation angle for a delta elevation pattern measured at a frequency of 9.3 GHz.
Figure 8:
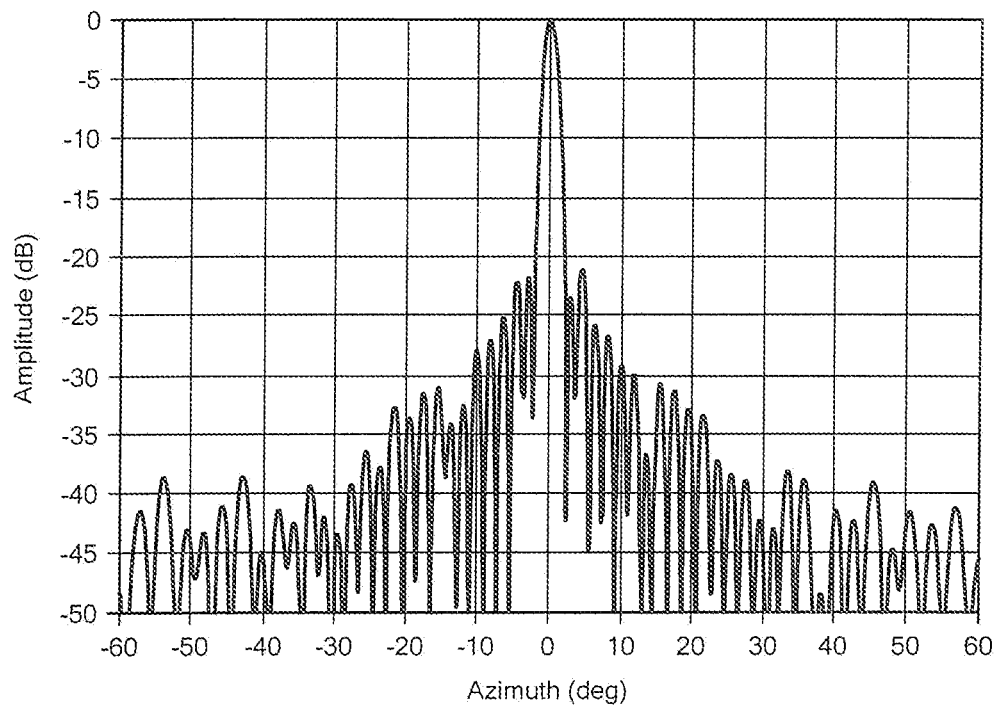
FIG. 8 is a plot of amplitude vs. azimuth angle for a receive sum pattern measured at a frequency of 9.3 GHz.
Figure 9:
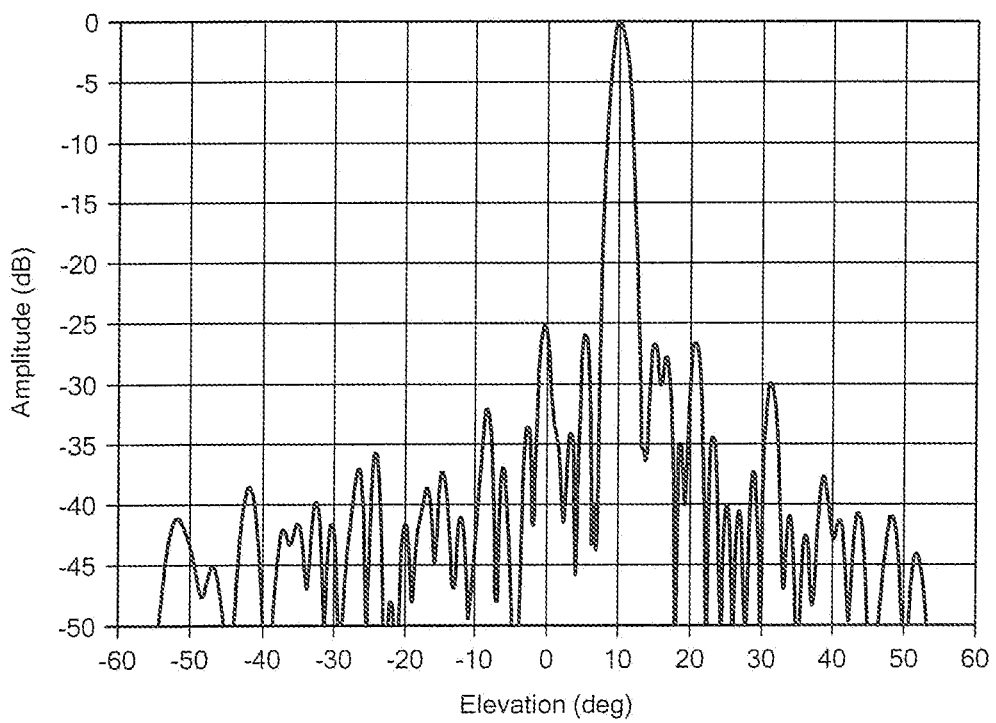
FIG. 9 is a plot of amplitude vs. elevation angle for a receive sum pattern measured at a frequency of 9.3 GHz.
Figure 10:
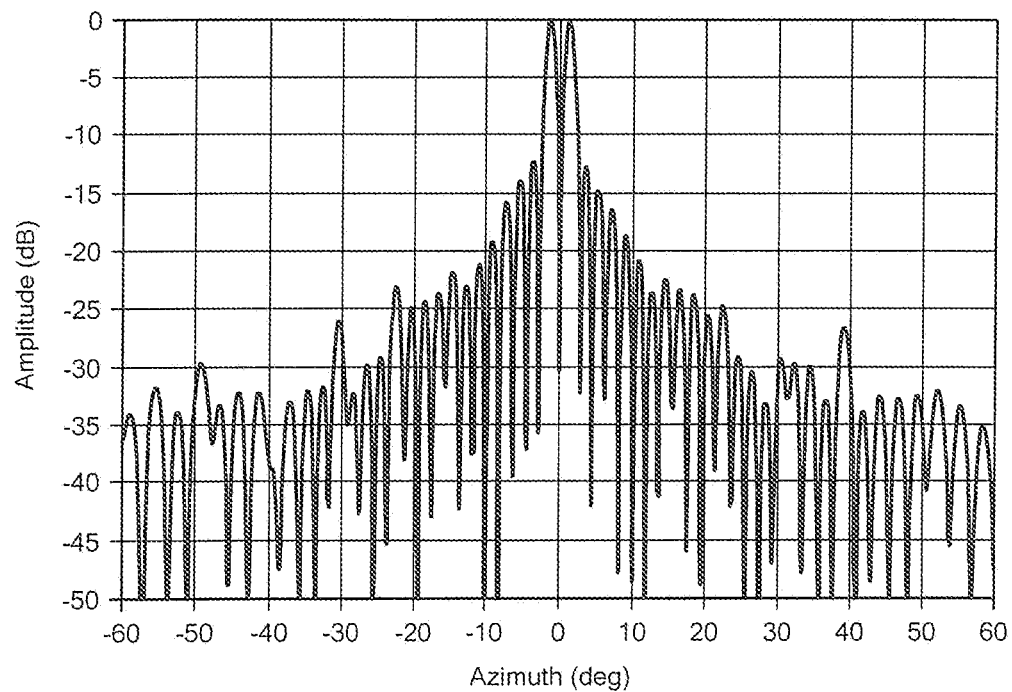
FIG. 10 is a plot of amplitude vs. azimuth angle for a receive delta azimuth pattern measured at a frequency of 9.3 GHz.
Figure 11:
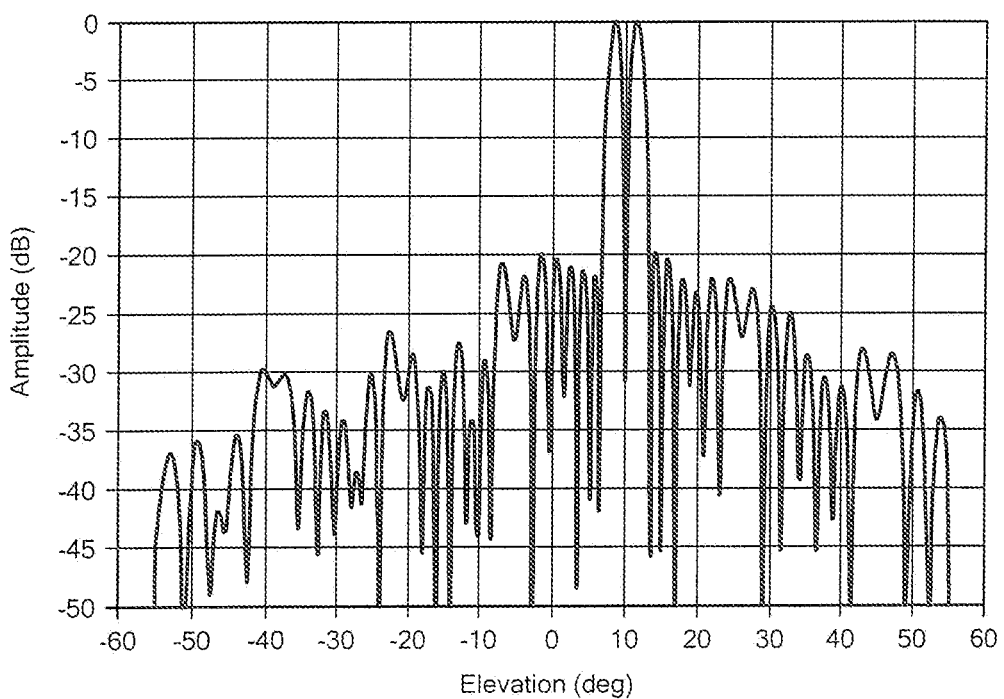
FIG. 11 is a plot of amplitude vs. elevation angle for a receive delta elevation pattern measured at a frequency of 9.3 GHz.

Referring now to FIG. 3, a flow diagram of an exemplary calibration process for a scalable, analog monopulse network is shown.

Processing begins in processing block 4-10 in which a near-field scan process is performed as part of a receive sum channel calibration process. As shown in processing block 4-12 amplitude calibration measurements are performed first.

Processing then proceeds to decision block 4-14 where a decision is made as to whether the residual amplitude error is at an acceptable level. The attenuator and phase shifter are quantized; each quantized bit setting has an associated error. Thus, the ideal calculated pattern (using perfectly quantized amplitude bits and perfectly quantized phase bits) is compared to the actual pattern produced by imperfect attenuators and imperfect phase shifters that have errors in each bit—the complex subtraction of the two patterns produces a non-zero, or residual, result which is the residual amplitude error. Decision block 4-14 thus implements a loop in which all or part of the amplitude calibration measurements are repeated until an acceptable residual amplitude error is reached. If a decision is made that the error is not acceptable, then processing flows back to processing block 4-12 where attenuator settings are adjusted for some, or all, T/R Channels and additional amplitude measurements are made.

Once an acceptable residual amplitude error is reached, the algorithm proceeds to processing block 4-16 in which a phase calibration measurement is performed.

Processing then proceeds to decision block 4-18 which implements a loop in which all or part of the amplitude and/or phase calibration measurements 4-12, 4-16 are repeated until an acceptable residual phase error is reached.

Once an acceptable residual phase error is reached the algorithm proceeds to processing block 4-20 in which the receive "pattern verification" is performed. It should be appreciated that pattern verification is a portion of the calibration process executed before moving on to calibration of the Delta Azimuth and Delta Elevation monopulse channels. This is done to make certain that the Receive Sum patter is acceptable before the calibration of the Delta channels begins This is done, at least in part, because the Delta Azimuth and Delta Elevation channels and their respective beams are formed by coupling a portion of the sum channel signal. For example, if the Receive Sum Channel calibration produces a Receive Sum pattern that has high sidelobes or poor beampointing accuracy (or an otherwise undesirable pattern characteristic compared to the ideal Receive Sum pattern), then the Delta Azimuth and Delta Elevation channels may also have an undesirable pattern characteristic such as high sidelobes or poor beampointing accuracy.

Receive Pattern Verification. The algorithm then proceeds to decision block 4-22 which implements a loop in which all or part of the amplitude and/or phase calibration measurements 4-12, 4-16 as well as pattern verification 4-20 are repeated until acceptable patterns relative to the ideal Receive Sum pattern are achieved.

Upon successful completion of Receive Sum channel pattern verification, the algorithm proceeds to a far-field scan portion 4-24 of the calibration process 4-08. In the far-field scan process 4-24 a receive delta elevation and delta azimuth channel calibration is performed.

The far-field monopulse calibration process 4-24 begins as shown in processing block 4-26 in which the Delta Elevation coupled channel and Delta Azimuth coupled channel measurements are made. The algorithm then proceeds to processing block 4-28 in which attenuation and phase settings for the Delta Elevation coupled channel and Delta Azimuth coupled channel are determined.

Processing then proceeds to processing block 4-30 in which the Delta Elevation replica channel and Delta Azimuth replica measurements are made.

The algorithm then proceeds to processing block 4-32 in which attenuation and phase settings for the Delta Elevation replica channel and Delta Azimuth replica channels are determined.

The algorithm then proceeds to processing block 4-34 where monopulse pattern verification for Delta Elevation and Delta Azimuth channels is performed.

The algorithm then proceeds to decision block 4-36 which implements a loop in which all or part of the processing shown in processing blocks 4-30 through 4-34 are repeated until acceptable residual amplitude and phase errors for delta elevation and delta azimuth channels are achieved.

Once decision block 4-36 has been satisfied and acceptable amplitude and phase errors have been achieved for both delta elevation and delta azimuth channels, the algorithm proceeds to a near-field scan process 4-38.

Near-field scan process 4-38 begins in processing block 4-40 in which a receive monopulse pattern verification is performed. Processing then flows to processing block 4-42 in which residual amplitude and phase errors for delta elevation and delta azimuth channels are computed.

Receive sum channel calibration is next described. As used herein: (a) the nomenclature "(0, 0)" refers to a beam-action setting (or command state) of 0 dB attenuation and 0 degrees insertion phase; (b) T/R channel "i" is part of panel "k"; and (c) Active monopulse board "k" is associated with panel "k"; (d) there are a total of N panels and N active monopulse boards in the AESA used in this example.

A receive sum channel calibration begins by turning "on" a single T/R channel in receive mode with all other T/R channels being "off" or in "stand-by" mode and positioning a near-field probe in front of the single on T/R channel (i.e. the channel which is "on" will amplify a received signal; all other channels are either completely powered off or powered in a "standby" state where they do not radiate RF power or amplify a received RF signal). RF measurements are made as the amplitude and phase (i.e., a "beam action") of the T/R channel is varied; this measurement is done at each frequency of interest.

The receive sum channel calibration process using the scalable, analog monopulse network calibration technique can be used for a general amplitude weighting across the AESA aperture. The AESA is assumed to have an n-bit attenuator and m-bit phase shifter for each T/R Channel "i". Receive sum channel weightings include, for example, uniform weighting or Taylor weighting. As described below (and in conjunction with FIGS. 14 and 15), an active monopulse board includes a plurality of controllers which control a plurality of channels.

The element phase is always set to 0 degrees for all amplitude calibration measurements (i.e. the phase shifter for a given element is commanded to the "0" degree phase state).

Receive Sum Channel (0, 0) state measurement. For initial receive sum channel amplitude measurement, all AESA T/R channel beam-action settings are set to a command state designated (0,0)—that is, "0" attenuation bit and "0" phase bit are set for each T/R channel; in all active monopulse boards, the receive sum channel controller U1 is also set to the (0,0) state and the remaining controllers U2-U5 are powered off or in the standby state. The voltage amplitude and phase for each T/R channel is then measured by a waveguide probe positioned in front of each T/R channel "i".

Receive Sum Channel amplitude weighting calibration: Initial Measurement. Based on the (0,0) measurement for T/R channel "i" in panel "k", set the desired attenuator state ($\alpha^{i,k}$, 0)—that is, $\alpha^{i,k}$ is the attenuation bit for T/R channel "i" belonging to panel "k" and "0" refers to the 0 phase bit setting for T/R channel "i" belonging to panel "k". Next, for active monopulse board "k" associated with panel "k": set a desired attenuator state the receive sum channel controller U1 denoted by ($\sigma^k$, 0°)—that is, "$\sigma^k$" is the attenuation bit for the U1 controller belonging to active monopulse board "k"; active monopulse board "k" is associated with panel "k" (there is one active monopulse board for each panel); again, "0" refers to the 0 phase bit setting for the U1 controller. The remaining controllers U2-U5 for active monopulse board "k" are powered off or in the standby state; also, all other panels "j" and active monopulse boards "j" where j≠k are powered off or in the standby state. With T/R Channel "i" state ($\alpha^{i,k}$, 0) and U1 state ($\sigma^k$, 0°) set, measure amplitude and phase for each T/R channel "i" at the Receive Sum output port 410 shown in FIG. 13. Repeat this sequence of measurements for each T/R Channel "i" for all panels "k" and active monopulse boards "k" for k=1 to N where N is the total number of panels in the AESA.

Receive Sum Channel amplitude weighting calibration: Amplitude Weighting Correction. To perform amplitude correction, compare measured vs. desired amplitude weighting for each T/R channels "i". Amplitude correction can be accomplished, for example, by adjusting attenuator settings for T/R channel "i" of panel "k", as required: upload attenuator correction $\alpha^{i,k}_{correction}$, ($\alpha^{i,k}_{correction}$, 0°) for T/R channel "i" of panel "k" and/or upload attenuator correction $\sigma^{i,k}_{correction}$, ($\sigma^{i,k}_{correction}$, 0°), for active monopulse board "k" receive sum channel U1 controller. After loading the correction(s), measure amplitude and phase for each T/R channel "i" of panel "k" at the Receive Sum output port 410 shown in FIG. 13. Compare measured amplitude for T/R channel "i" of panel "k" versus desired amplitude for T/R channel "i" of panel "k"; repeat the amplitude correction process for each set of panels "k" and active monopulse boards "k" for k=1 to N until desired residual amplitude error has been achieved. The final amplitude weighting for T/R channel "i" in panel "k" is designated ($\alpha^{i,k}_{cal}$, 0°) and the final amplitude weighting for active monopulse boards "k" U1 controller setting is designated ($\sigma^k_{cal}$, 0°).

The receive sum channel phase calibration can be performed as a near-field measurement or far-field measurement. Near-field data collection is characterized by a waveguide probe positioned at the geometric center of a radiator at a distance of at least three free space wavelengths from the plane of the array radiator. Far-field data collection is characterized by a waveguide probe positioned at the geometric center of a radiator at a distance of at least $2*D^2/\lambda$ where D is the maximum dimension in the plane of the radiator and $\lambda$ is the free space wavelength. The receive sum channel phase is measured for each T/R Channel "i" for each panel "k" for k=1 to N. The phase measurement is performed for some, or a subset, of the $2^n$ phase shifter states for each T/R Channel "i" controller. A "best-fit" line (e.g. determined using a least-squares fit technique) is then calculated for each T/R channel "i" for each panel "k" at each calibration frequency.

Receive Sum Channel Phase Calibration. Upload state ($\alpha^{i,k}_{cal}$, 0°) to the controller in each T/R channel "i" in panel "k"; $\alpha^{i,k}_{cal}$ is the final attenuator bit setting from the Receive Sum Channel amplitude weighting calibration step. Load state ($\sigma^k_{cal}$, 0°) in the receive sum channel controller U1 for active monopulse board "k"; $\sigma^k_{cal}$ is the final attenuator bit setting for active monopulse board "k" from the Receive Sum Channel amplitude weighting calibration step. For each active monopulse board "k", for k=1 to N, controllers U2-U5 are powered off or in the standby state.

Receive Sum Channel Phase Calibration. For each T/R channel "i" in panel "k": measure all, or a subset, of the $2^n$ phase shifter states at the Receive Sum output port 410 shown in FIG. 13. Repeat this measurement process for all T/R channel "i" for each panel "k" and each active monopulse board "k" for k=1 to N, at each calibration frequency desired.

For each T/R channel "i", a "best-fit" phase slope line is generated from the measured phase states at each frequency desired.

Receive Sum Channel Pattern Verification. Upon completion of the Receive Sum Channel Amplitude weighting calibration and phase calibration, Receive Sum Channel pattern verifications are performed before starting the Delta Elevation and Delta Azimuth Channel Calibration. Receive Sum Channel patterns can be performed with a standard near-field scan using a waveguide probe or the Receive Sum Channel pattern can be taken using a waveguide probe with the AESA in the far-field of a panel.

The number of pattern verification scans are based upon AESA antenna pattern requirements. For example, pattern verification measurements can be taken at the following scan angles ($\theta,\phi$): (0°,0°), (45°,0°), (45°,90°), (45°,45°).

During Receive Sum Channel Pattern Verification, all T/R Channels "i" are powered on: For each T/R channel "i" of panel "k" and active monopulse board "k", upload Receive Sum Channel calibration constant ($\alpha^{i,k}_{cal}$, $\phi^{i,k}_{cal}$) in panel "k" where $\phi^{i,k}_{cal}$ is the phase command for T/R Channel "i" that commands the Receive Sum Channel beam to the desired ($\theta,\phi$) scan angle and load ($\sigma^k_{cal}$, 0°) into the U1 controller for active monopulse board "k". For each active monopulse board "k", for k=1 to N, controllers U2-U5 are powered off or in the standby state.

Determination of AESA Panel Far-Field Distance. Calibration of the monopulse delta Elevation and delta Azimuth channels is accomplished with a far-field measurement. AESA distance from a waveguide probe is based upon the largest dimension (D) of the panel, or sub-array, using the first-order far-field formula $2D^2/\lambda$, in where $\lambda$ is the free space wavelength at the calibration frequency. One exemplary X-Band AESA is provided having 8 rows×4 columns of panels (i.e., 32 panels comprising the AESA aperture). The panel dimension is 10.2 in (x) by 4.7 in (y) and the far-field of the panel at 10 GHz is 17.5 feet; therefore, the distance between the AESA and waveguide probe is 17.5 feet.

The far-field measurement scan is an 8×4 point scan where each waveguide probe position is in the geometric center of panel "k" for k=1 to 32. In general, the far-field measurement scan will be an n-row×m-column scan for an AESA with n*m panels (or sub-arrays). At each point in the far-field measurement scan, only 1 panel is turned on (all other panels are powered off or in "stand-by" mode).

Monopulse Channel Calibration: Baseline Measurement. For each T/R channel "i" of panel "k" and active monopulse board "k", upload Receive Sum Channel calibration constant ($\alpha^{i,k}_{cal}$, $\phi^{i,k}_{cal}$) in panel "k" where $\phi^{i,k}_{cal}$ is the phase command for T/R Channel "i" that commands the Receive Sum Channel beam to boresite ($\theta=0°,\phi=0°$) and load ($\sigma^k_{cal}$, 0°) into the U1 controller for active monopulse board "k". All T/R channels in panel "k" are powered on.

Delta Elevation Channel Measurement. The sequence of steps described for the Delta Elevation Channel Measurement is the same for the Delta Azimuth Channel-except for the controllers that are used to calibrate the Delta Elevation Channel are controllers U2 and U5 and the controllers used to calibrate the Delta Azimuth Channel are controllers U3 and U4. There are two measurement steps for the Delta Elevation Channel and Delta Azimuth Channel: a "coupled" channel measurement and "replica" channel measurement step.

Figure 14:
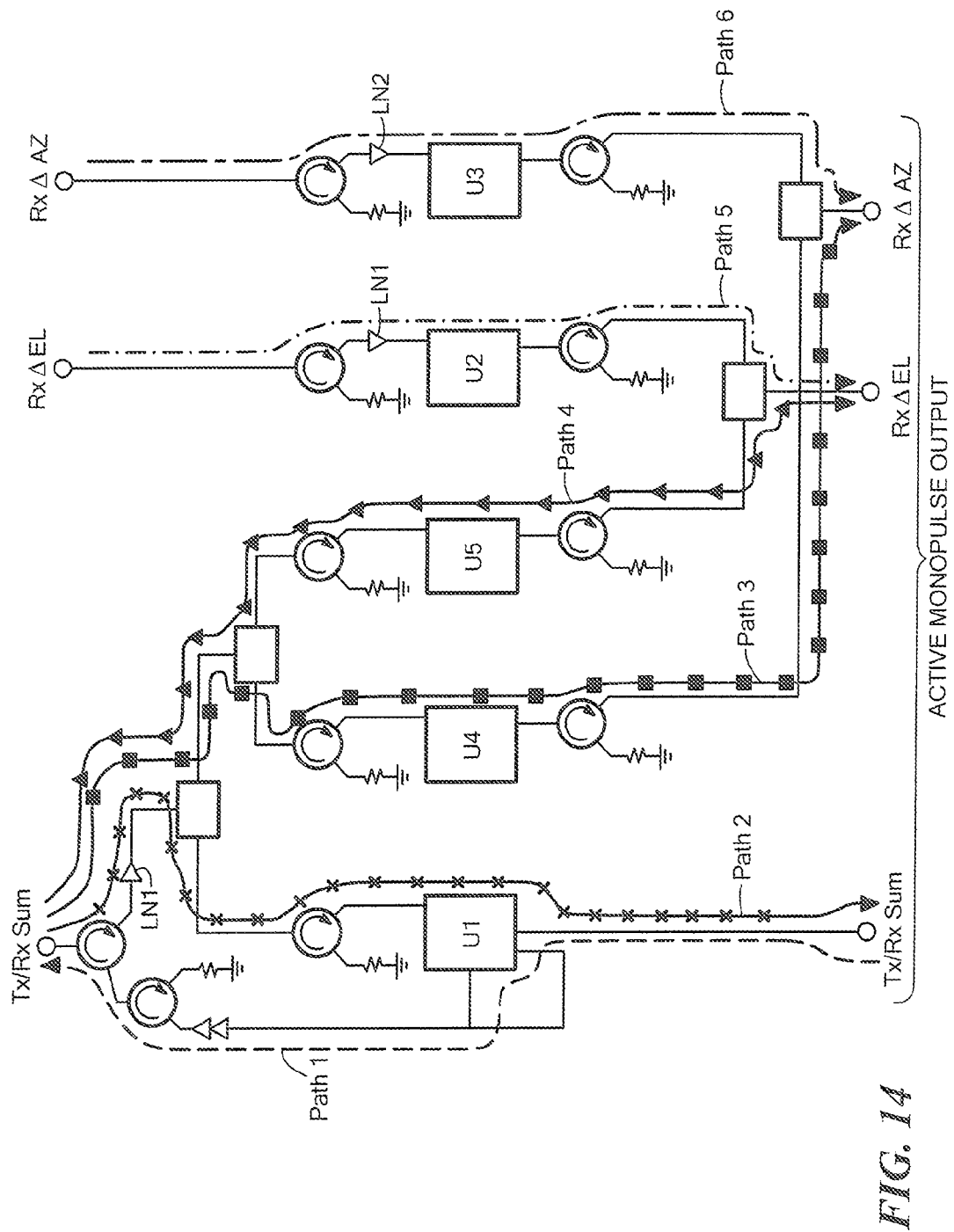
FIG. 14 is a block diagram of an active monopulse circuit illustrating signal flow to provide monopulse signals.

Delta Elevation Coupled Channel Measurement. For each T/R channel "i" of panel "k" and active monopulse board "k", upload Receive Sum Channel calibration constant ($\alpha^{i,k}_{cal}$, $\phi^{i,k}_{cal}$) in panel "k" where $\phi^{i,k}_{cal}$ is the phase command for T/R Channel "i" that commands the Receive Sum Channel beam to boresite (θ=0°,φ=0°) and load ($\sigma^k_{cal}$, 0°) into the U1 controller for active monopulse board "k". All T/R channels in panel "k" are powered on. For active monopulse board "k", power on U3 controller and power off (or command to standby state) controllers U2, U4 and U5 (FIG. 14).

Delta Azimuth Coupled Channel Measurement. For each T/R channel "i" of panel "k" and active monopulse board "k", upload Receive Sum Channel calibration constant ($\alpha^{i,k}_{cal}$, $\phi^{i,k}_{cal}$) in panel "k" where $\phi^{i,k}_{cal}$ is the phase command for T/R Channel "i" that commands the Receive Sum Channel beam to boresite (θ=0°,φ=0°) and load ($\sigma^k_{cal}$, 0°) into the U1 controller for active monopulse board "k". All T/R channels in panel "k" are powered on. For active monopulse board "k", power on U3 controller and power off (or command to standby state) controllers U2, U4 and U5 (FIG. 14).

Delta Elevation Coupled Channel Measurement. The far-field measurement begins by positioning the waveguide probe at the geometric center of panel "k." The U2 controller is cycled through ≤$2^m$ attenuation and ≤$2^n$ phase shifter phase states; a measurement is made at the Delta Elevation Output port (409 in FIG. 13) for each state.

Delta Azimuth Coupled Channel Measurement. The far-field measurement begins by positioning the waveguide probe at the geometric center of panel "k". The U3 controller is cycled through ≤$2^m$ attenuation and ≤$2^n$ phase shifter phase states; a measurement is made at the Delta Azimuth Output port (408 in FIG. 13) for each state.

After the data is collected for the Delta Elevation Coupled Channel and the Delta Azimuth Coupled Channel, the waveguide probe is moved to the next panel "k+1"; panel "k" and active monopulse board "k" are powered off. Next, for each T/R channel "i" of panel "k+1" and active monopulse board "k+1", upload Receive Sum Channel calibration constant ($\alpha^{i,k+1}_{cal}$, $\phi^{i,k+1}_{cal}$) in panel "k+1" where $\phi^{i,k+1}_{cal}$ is the phase command for T/R Channel "i" that commands the Receive Sum Channel beam to boresite (θ=0°,φ=0°) and load ($\sigma^{k+1}_{cal}$, 0°) into the U1 controller for active monopulse board "k+1".

The coupled channel data collection is performed for all panels "k" and all active monopulse boards "k" for k=1 to N.

Delta Elevation Coupled Channel and the Delta Azimuth Coupled Channel Amplitude and Phase Selection. From the raw measured amplitude and phase data for each coupled channel, select the U2 and U3 controller attenuation bit that minimizes the residual amplitude error for active monopulse board "k"; these calibration constants are denoted as ($\sigma^k_{ELcoup}$, $\phi^k_{ELcoup}$) and ($\sigma^k_{Azcoup}$, $\phi^k_{Azcoup}$) for U2 and U3, respectively, for all active monopulse boards k=1 to N.

Delta Elevation Replica Channel Measurement and Delta Azimuth Replica Channel Measurement. For each T/R channel "i" of panel "k" and active monopulse board "k", upload Receive Sum Channel calibration constant ($\alpha^{i,k}_{cal}$, $\phi^{i,k}_{cal}$) in panel "k" where $\phi^{i,k}_{cal}$ is the phase command for T/R Channel "i" that commands the Receive Sum Channel beam to boresite (θ=0°,φ−0°) and load ($\sigma^k_{cal}$, 0°) into the U1 controller for active monopulse board "k". All the T/R channels in panel "k" are powered on.

Delta Elevation Replica Channel Measurement. For active monopulse board "k", power on U5 controller and power off (or command to standby state) controllers U3 and U4 (FIG. 14). Upload calibration constant ($\sigma^k_{ELcoup}$, $\phi^k_{ELcoup}$) for controller U2. U5 controller is cycled through ≤$2^m$ attenuation and ≤$2^n$ phase shifter phase states; a measurement is made at the Delta Elevation Output port 409 in FIG. 13 for each state.

Delta Azimuth Replica Channel Measurement. For active monopulse board "k", power on U4 controller and power off (or command to standby state) controllers U2 and U5 (FIG. 14). Upload calibration constant ($\sigma^k_{Azcoup}$, $\phi^k_{Azcoup}$) for controller U2. U4 controller is cycled through ≤$2^m$ attenuation and ≤$2^n$ phase shifter phase states; a measurement is made at the Delta Azimuth Output port 408 in FIG. 13 for each state.

After the data is collected for the Delta Elevation Replica Channel and the Delta Azimuth Replica Channel, the waveguide probe is moved to the next panel "k+1"; panel "k" and active monopulse board "k" are powered off. Next, for each T/R channel "i" of panel "k+1" and active monopulse board "k+1", upload Receive Sum Channel calibration constant ($\alpha^{i,k+1}_{cal}$, $\phi^{i,k+1}_{cal}$) in panel "k+1" where $\phi^{i,k+1}_{cal}$ is the phase command for T/R Channel "i" that commands the Receive Sum Channel beam to boresite (θ=0°,φ=0°) and load ($\sigma^{k+1}_{cal}$, 0°) into the U1 controller for active monopulse board "k+1".

The replica channel data collection is performed for all panels "k" and all active monopulse boards "k" for k=1 to N.

Delta Elevation Replica Channel and the Delta Azimuth Replica Channel Amplitude and Phase Selection. From the raw measured amplitude and phase data for each replica channel, select the U5 and U4 controller attenuation bit and phase bit that minimizes the residual amplitude error for active monopulse board "k"; these calibration constants are denoted as ($\sigma^k_{ELrepl}$, $\phi^k_{ELrepl}$) and ($\sigma^k_{Azrepl}$, $\phi^k_{Azrepl}$) for U5 and U4, respectively, for all active monopulse boards k=1 to N.

Monopulse Patter: Far-Field Verification Scans. Pattern scans are taken in the far-field of the AESA panel to characterize the Delta Azimuth and Delta Elevation pattern characteristics prior to moving the AESA back to the near-field to perform final pattern acceptance scans. The far-field scan plane covers the physical area of the AESA. The far-field patterns examine the alignment of the Delta Channel monopulse nulls versus the Receive Sum beam at boresite and monopulse null slope; relative sidelobe symmetry and sidelobe level in elevation and azimuth are examined. Finally, the Measured Delta Elevation and Delta Azimuth patterns are then compared with the ideal Delta Elevation and Delta Azimuth patterns. If the Delta Azimuth and Delta Elevation pattern characteristics are acceptable, the AESA is moved back to the near-field and final pattern acceptance scans are performed.

Monopulse Patter: Far-Field Verification Scans. A pattern measurement is performed in the far-field of the AESA panel. A switch matrix is used to measure the outputs at ports 408 (Delta Azimuth), 409 (Delta Elevation) and port 410 (Receive Sum) during the scan process. The waveguide probe executes a raster scan over the physical area of the AESA with data recorded every half-wavelength at the calibration frequency of interest. The entire AESA is turned on in Receive:

Load Receive Sum Channel calibration constant ($\alpha^{i,k}_{cal}$, $\phi^{i,k}_{cal}$) in panel "k" for all panels k=1 to N. For active monopulse board "k", load ($\sigma^k_{cal}$, 0°) into U1 controller; ($\sigma^k_{ELcoup}$, $\phi^k_{ELcoup}$) for controller U2; ($\sigma^k_{Azcoup}$, $\phi^k_{Azcoup}$) for controller U3; and ($\sigma^k_{Azrepl}$, $\phi^k_{Azrepl}$) for U4 and ($\sigma^k_{ELrepl}$, $\phi^k_{ELrepl}$) for U5, for all active monopulse boards k=1 to N Monopulse Pattern: Post-process data reduction. 1. Compare alignment of the Delta Elevation and Delta Azimuth Channel monopulse nulls versus the Receive Sum beam peak at boresite; 2. Compute monopulse null slope for Delta Elevation and Delta Azimuth Channels; 3. Examine relative sidelobe symmetry and sidelobe level in elevation and azimuth; 4. Compare measured Delta Elevation and Delta Azimuth patterns the ideal Delta Elevation and Delta Azimuth patterns. If the Delta Elevation and Delta Azimuth Channel pattern performance is acceptable, the AESA is moved back to the near-field for final pattern acceptance scans. If the Delta Elevation and Delta Azimuth Channel pattern performance is unacceptable, a new set of coupled channel and/or replica channel calibration constants are chosen to reduce the amplitude and/or phase error and the far-field pattern verification scans are repeated.

Table 1 lists the final receive patterns generated with near-field scans using the scalable, analog monopulse network calibration technique in an exemplary X-Band AESA and described herein and FIGS. 5-12 show the patterns listed in Table 1.

azimuth coupling networks represented by rows 215A-215H correspond to antenna ports. It should also be noted that beamformer 120 may also be implemented using eight elevation coupling networks (combining eight T/R Channels) and one azimuth coupling network (combining the 16 columns of elevation coupling networks).

The monopulse level 1 beamformer network (i.e. the passive beamformer network at the panel level; this is the beamformer with the couplers for the Delta Az and Delta El channels) has a Tx/Sum output port 301, $a_A$ $\Delta AZ$ output port 303

TABLE 1

| Priority | Beam Spoiling | El (deg) | Az (deg) | Port | Freq. | Pattern Cuts (Post Processing) | U | V |
|---|---|---|---|---|---|---|---|---|
| 1 | 1X | 0 | 0 | Sum | 9.3 GHz | Contour plot of $\Delta u = (0.0384, 0.0384)$, $\Delta v = (0.041, 0.041)$ centered at (u. v) | 0 | 0 |
| 2 | 1X | 0 | 0 | $\Delta Az$ | 9.3 GHz | Contour plot of $\Delta u = (0.0384, 0.0384)$, $\Delta v = (0.041, 0.041)$ centered at (u. v) | 0 | 0 |
| 3 | 1X | 0 | 0 | $\Delta EL$ | 9.3 GHz | Contour plot of $\Delta u = (0.0384, 0.0384)$, $\Delta v = (0.041, 0.041)$ centered at (u. v) | 0 | 0 |
| 15 | 1X | 10 | 0 | $\Delta EL$ | 9.66 GHz | Contour plot of $\Delta u = (0.0384, 0.0384)$, $\Delta v = (0.041, 0.041)$ centered at (u. v) | 0 | 0.173649 |
| 16 | 1X | 10 | 0 | Sum | 10 GHz | Contour plot of $\Delta u = (0.0384, 0.0384)$, $\Delta v = (0.041, 0.041)$ centered at (u. v) | 0 | 0.173649 |
| 17 | 1X | 10 | 0 | Az | 10 GHz | Contour plot of $\Delta u = (0.0384, 0.0384)$, $\Delta v = (0.041, 0,041)$ centered at (u. v) | 0 | 0.173649 |

The scalable, analog monopulse network calibration technique has been successfully demonstrated in an exemplary X-Band AESA. For this exemplary embodiment, an AESA three-channel monopulse calibration is used over a frequency band of 9.3-10 GHz. Monopulse pattern performance at 9.3 GHz is summarized as shown below.

| i. Scan Angle: El = 0°, Az = 0° | |
|---|---|
| Delta Azimuth Monopulse: | 28 dB null |
| Delta Elevation Monopulse: | 37 dB null |
| ii. Scan Angle: El = 10°, Az = 0° | |
| Delta Azimuth Monopulse: | 31 dB null |
| Delta Elevation Monopulse: | 32 dB null |

Figure 12:
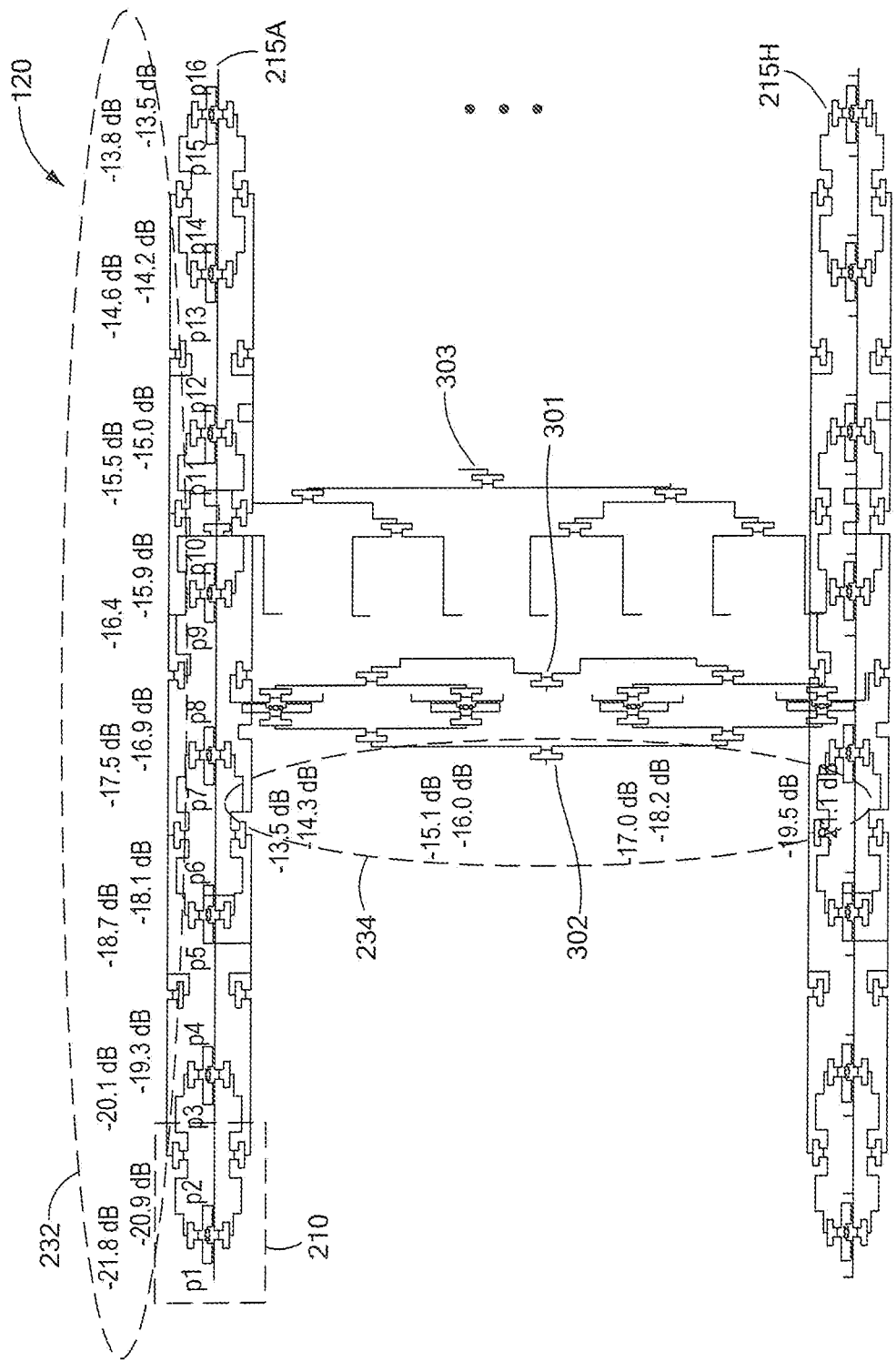
FIG. 12 is a diagram of a beamformer implemented for an eight (8) row by sixteen (16) column sub-array and associated azimuth and elevation coupler values, according to one exemplary embodiment of an array.

FIG. 12 shows one embodiment of a beamformer 120 (implemented for an eight (8) row×sixteen (16) column [i.e., a 128 element] sub-array) and associated azimuth 232 and elevation 234 coupler values, each generated in accordance with the techniques described in co-pending application Ser. No. 13/267,193, filed on Jun. 6, 2011 entitled: "An RF Feed Network for Modular Active Aperture Electronically Steered Arrays" and assigned to the assigned of the present application and incorporated herein by reference in its entirety. Beamformers 120 includes eight rows 215A-215H (with rows 215A and 215H being show in FIG. 12). Each row 215A-215H includes eight azimuth coupling networks 210 in each of two of the eight rows 215A-215H are shown, along with one elevation coupling network. It should be noted that and a $\Delta EL$ output port 302. The monopulse beamformer network may be the same as or similar to the type used in the above mentioned SEC radar.

The Monopulse Level-1 Beamformer is a passive, corporate RF coupling network; the formulation is general for a $2^n$:3 beamforming network. For the exemplary AESA monopulse beamforming network described herein, the Monopulse Level 1 Beamformer is two-dimensional RF network: 8 rows of 16 T/R channels to form a 128:3 Monopulse beamformer network. There is one Monopulse Level-1 Beamformer per 128 T/R Channel Panel.

In one exemplary embodiment, the Monopulse Level-1 Beamformer is provided as a printed wiring board with three stripline layers. FIG. 12A-12D show the 8 row×16 column (128 element) Monopulse Level-1 beamformer composite stripline layer circuits. The coupler values may be determined by equations given in co-pending application Ser. No. 13/267, 193, filed on Jun. 6, 2011 entitled: "An RF Feed Network for Modular Active Aperture Electronically Steered Arrays" and assigned to the assigned of the present application and is hereby incorporated herein by reference in its entirety. It should, of course, be appreciated that the Monopulse Level-1 Beamformer may be provided using other circuit types (e.g. microstrip circuits) and that the couplers may also be provided having coupling values other than those computed in accordance with the teachings of the aforementioned co-pending application Ser. No. 13/267,193.

In one embodiment, the RF circuits which comprise the beamformer are disposed on three stripline layers with the basic RF circuit building block provided as a Wilkinson divider/combiner circuit.

Figure 12A:
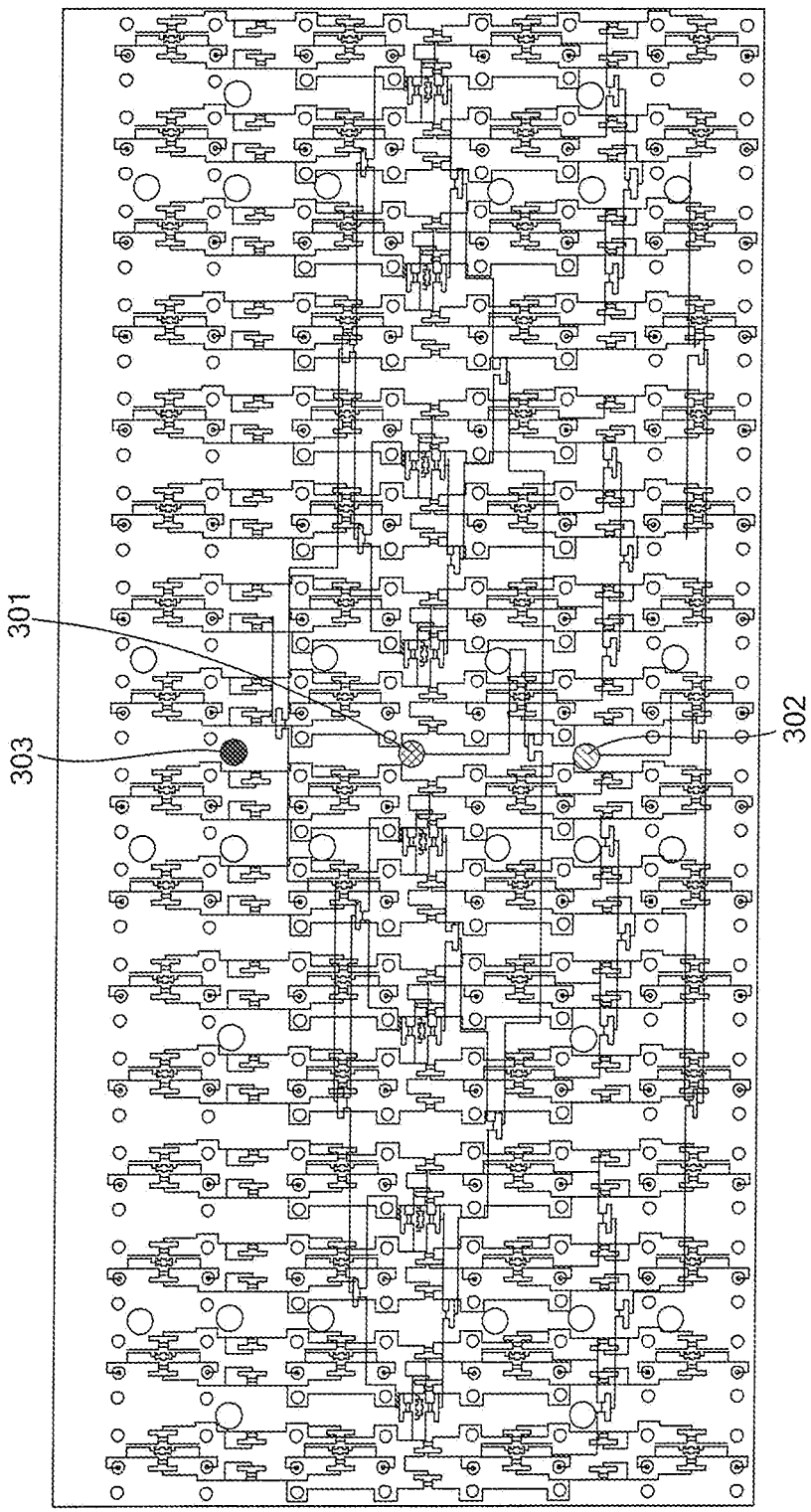
FIG. 12A is a diagram of stripline circuitry used to provide an azimuth beamformer circuit.

FIG. 12A shows a representative stripline layout for an implementation of beamformer 120, according to one exemplary embodiment. In this view, the stripline circuit layout is implemented in three layers, shown superimposed one above the other. The 128:3 ($2^7$:3) RF network depicted comprises the following RF input/output (I/O) connections: Port 301 conveys the transmit/receive (TX/RX) sum signal; Port 302 conveys the receive (RX) delta elevation signal; and Port 303 conveys the RX delta azimuth signal. (These signal outputs are also shown in FIG. 12, for clarity.) In other words, FIG. 12A shows a realization of beamformer 120 as an 8 row by 16 column beamformer circuit: 301 is the Transmit/Receive Sum port; 302 is the Receive Delta Elevation port; 303 is the Receive Delta Azimuth port.

Figure 12B:
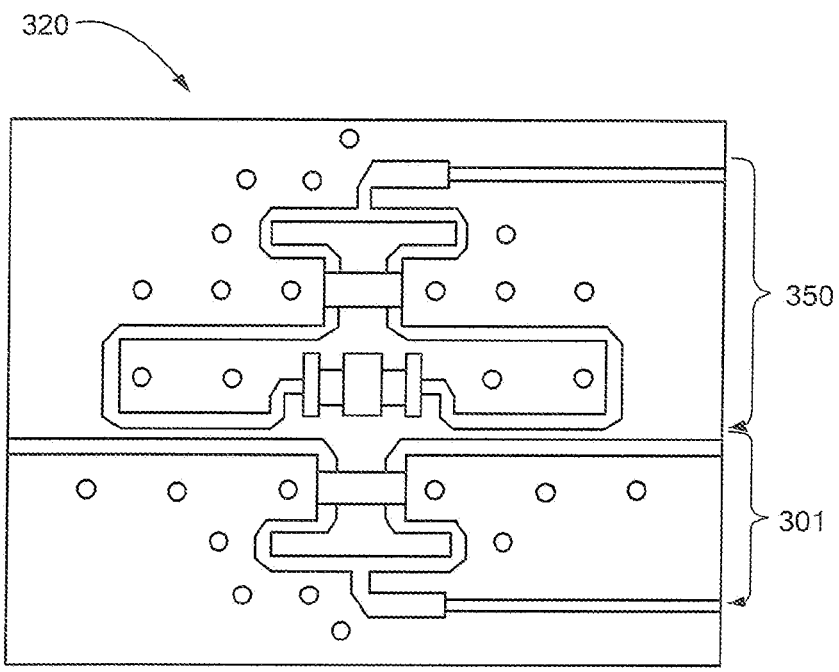
FIG. 12B is a diagram of stripline circuitry used to provide an elevation beamformer circuit.
Figure 12C:
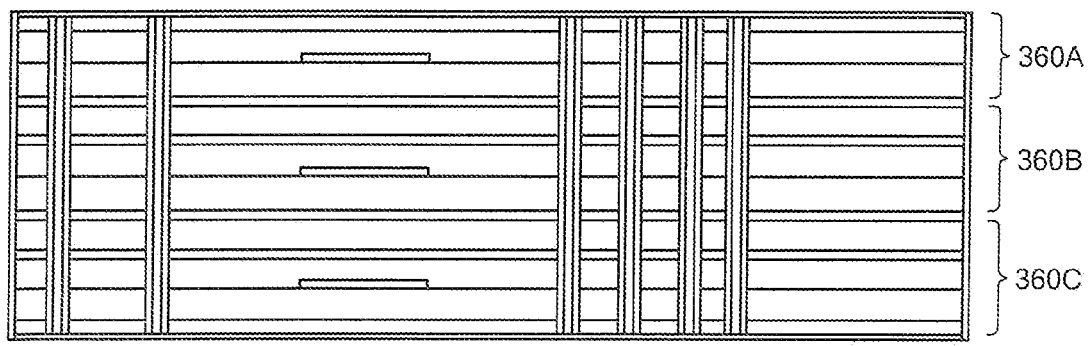
FIG. 12C is a diagram of stripline circuitry used to provide an elevation and azimuth combiner beamformer stripline circuit.

As described above with respect to FIG. 12A, the RF circuits may be fabricated on three stripline layers 360A-360C as shown in the notional cross-sectional view of FIG. 12C. FIG. 12C thus depicts a cross-sectional stack-up of an exemplary printed wiring board constructed according to the circuit layout of FIG. 12A. The PWB is comprised of three separate stripline circuits; the circuits on layers 2, 5, and 8 are interconnected with plated through-hole vias.

Referring now to FIG. 12B, a passive combiner building block 320 from which a passive monopulse beamformer may be provided (such as beamformer 120 discussed above in conjunction with FIG. 12) includes a transmit-receive (TX/RX) sum channel portion provided from a conventional Wilkinson divider/combiner circuit having a port 301 corresponding to a TX/RX sum signal port. Passive combiner building block 320 also includes a coupled channel portion provided from a conventional Wilkinson divider/combiner circuit having a port 350 corresponding to the coupled channel output, which is either the delta azimuth or delta elevation signal. This is thus one exemplary embodiment of a passive combiner unit cell layout for a uniform beamformer circuit 301 and coupled beamformer circuit 350; both circuits are based on the standard Wilkinson 4-port divider/combiner with the fourth port terminated in a resistor. The coupled port weightings of circuit 350 are determined in accordance with the techniques described in the aforementioned co-pending application Ser. No. 13/267,193.

Figure 13:
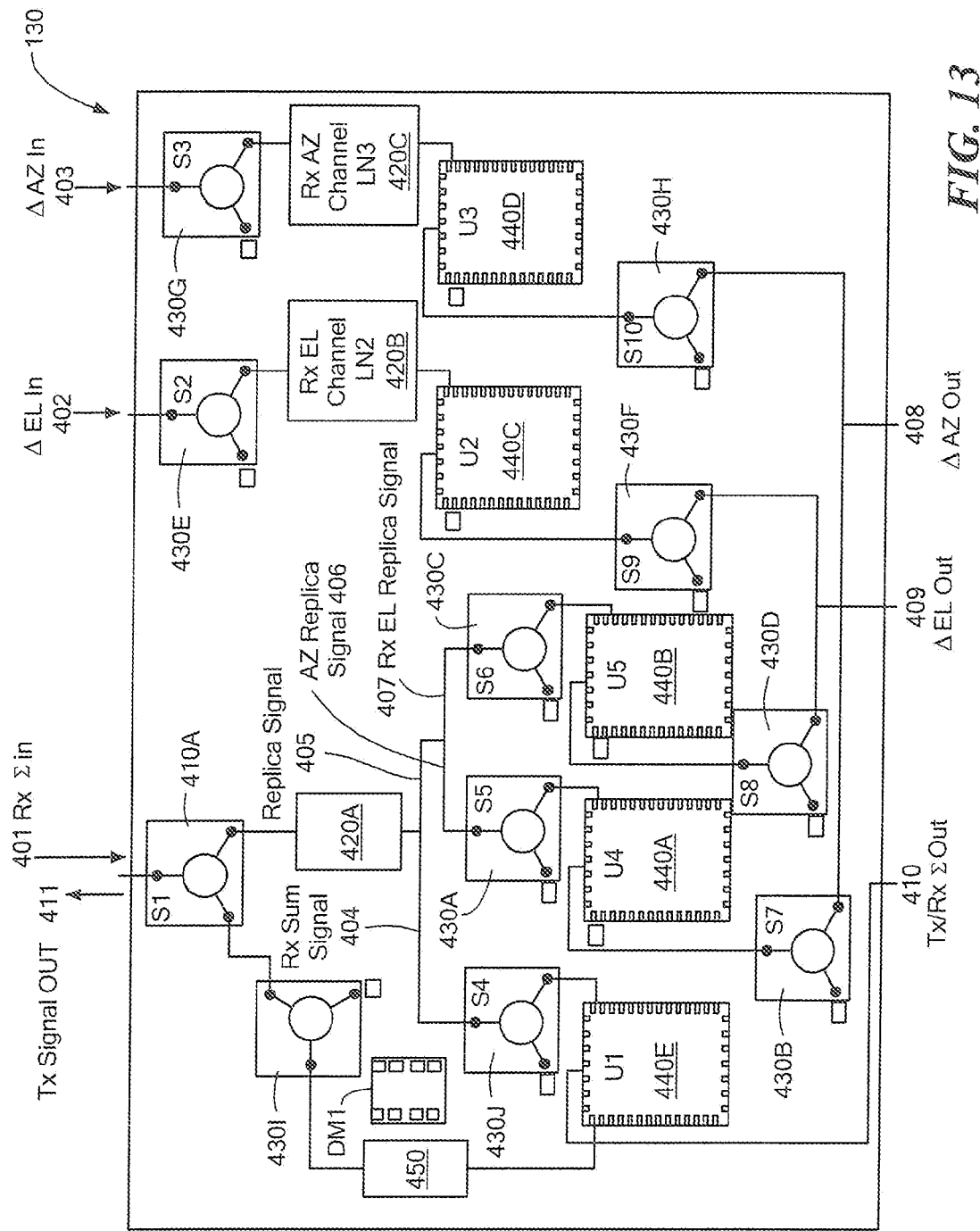
FIG. 13 is a block diagram of an active monopulse circuit.

FIG. 13 depicts a high-level block diagram of a representative circuit layout for an active monopulse processor 130 according to one embodiment. Active monopulse processor 130 receives three RF input signals 401, 402, and 403 each of which is described in further detail in the following paragraphs. There may be a fourth signal, the transmit (TX) output signal, as well. The amplitude weighting functions for each channel are determined by the Equation.

$$20 \cdot \text{Log}\left[\frac{2 \cdot (m-1) \cdot N - M \cdot N}{2 \cdot M \cdot N}\right] (\text{dB})$$

and applied electronically by controllers 440A-440D. Note that the replica attenuation depends only upon the sub-array index, m, within the array. Addition of active electronic components 440A and 440B provides design flexibility by allowing a relatively wide range of electronic attenuator weighting as well as electronic insertion phase. Addition of active electronic components 440C and 440D provides another degree of freedom to correct for amplitude differences between the replica and coupled paths due to manufacturing, material and component tolerances in beamformer circuits 120 (FIG. 12) and active monopulse processor 130 (FIG. 13) and electronic insertion phase. Addition of active electronic component 440A is used to drive power amplifier 450 during the transmit pulse; in receive, attenuation may be added to minimize the overall weighting on the T/R channels in sub-array module 100. Controllers 440A-440D thus provide amplitude and phase level adjustment for each signal path in the monopulse processor.

The Receive Sum Channel (RX Σ) signal 401 passes through circulator 410A and is amplified by Low Noise Amplifier (LNA) 420A and split into the Receive Sum signal 404 and Replica Channel signal 405. The Replica Channel signal 405 is again split into the following signals:

Azimuth Replica signal 406, which goes through isolator 430A, active controller 440A, and finally through isolator 430B; the signal is then combined with the processed Receive Delta Azimuth Channel signal 403 to produce the Receive Delta Azimuth (RXΔAz) Channel Output 408.

Elevation Replica signal 407, which goes through isolator 430C, active controller 440B, and finally through isolator 430D; the signal is then combined with the processed Receive Delta Elevation Channel signal 402 to produce the Receive Delta Elevation (RXΔEl) Channel Output 409.

Receive Sum signal 404 proceeds through isolator 430J and active controller 440E to produce RX Sum Channel Output 410.

Receive Delta Elevation (RXΔEl) Channel signal 402 proceeds through isolator 430E, amplifier LNA 420B, active controller 440C, and finally through isolator 430F. The signal is then combined with Elevation Replica signal 407 to produce the Receive Delta Elevation Channel Output 409.

Receive Delta Azimuth (RXΔAz) Channel signal 403 proceeds through isolator 430G, amplifier LNA 420C, active controller 440D and finally passes through isolator 430H. The signal is then combined with the Azimuth Replica signal 406 to produce the Receive Delta Azimuth Channel Output 408.

The Transmit Channel Input 410 proceeds first through controller 440E, power amplifier 450, through isolator 430I and finally through circulator 410A before leaving the module as TX signal Output 411. Controller 440E provides drive power amplification to PA 450 on transmit; on receive, Controller 440E provides phase and attenuation control for the Receive Sum channel output. Controller 440E does not differ from controllers 440A-440D in terms of phase and attenuation control in receive mode; 440A-440D have the capability to also provide drive power amplification in transmit mode, but this function may not be used in some implementations.

Circuit DM1 of FIG. 3 may be, in some exemplary embodiments, a drain modulator circuit that controls PA 450. DM1 controls the drain voltage, and hence drain current, to the power amplifier 450. Controller 440A provides the control signal to turn DM1 on. During transmit, DM1 is "on" and voltage is applied to the PA drain circuit; during receive, DM1 is off and hence the PA is off.

Each output 408, 409, 410 goes to a uniform combiner: one for the Transmit Channel Input/RX Sum Channel Output 410, one for the Receive Delta Elevation Channel Output 409, and one for the Receive Delta Azimuth Channel Output 408.

In some embodiments, the active controller devices 440A-440E may be employed to correct amplitude and phase imbalances in each signal path. This is desirable because, since each monopulse processor combines a number of T/R channels, the amplitude and phase errors have a de-correlation based on the number of sub-arrays.

Manufacturing considerations require that the range of coupler weightings and the range of variable attenuator weightings are realizable. This is accomplished as described in the aforementioned copending application Ser. No. 13/267,193

In some implementations of the present systems and methods, the insertion phase of the Coupled El path (or Coupled Az path) is electronically adjusted using 440C (440D) to be in phase with the Receive Sum output insertion phase 410. The insertion phase of the El Replica signal 407 (or Az Replica signal 406) is then adjusted by 440B (440A) to be either in phase with the Coupled El path (or Coupled Az path) or 180° out of phase with the Coupled El path (Coupled Az path), depending on the relative sign between the first and second terms.

In one exemplary embodiment, transmit-side controller 440E may be implemented with a SiGe Common Leg Circuit (CLC) in conjunction with a 6-bit phase shifter and a 5-bit attenuator control.

In some embodiments, active controllers 440A-44E may be implemented in one or more Silicon-Germanium (SiGe) monolithic microwave integrated circuits (MMICs) devices, utilizing methods well-known to those of skill in the arts. Likewise, other implementations are also possible and known to the ordinary practitioner. Accordingly, the present invention is to be understood as not limited by the manner in which the controller function may be implemented and includes all such implementations.

In an alternate embodiment, the SiGe controller MMIC may be replaced by a controller implementing similar functionality in Gallium Arsenide (GaAs). In one exemplary embodiment, controllers 440A-440E may be implemented using Raytheon Company part number SSM1886 for all or some of controllers 440A-440E. In an alternate embodiments, a similar controller implemented in GaAs may also be used for controllers 440A-440E. Likewise, the PA and LNA functions of T/R channel components 112 and/or monopulse processor 130 may be implemented in GaAs using Raytheon part numbers PA-0608 and LN-0211, respectively. Drain modulator DM1 may be implemented using Raytheon Company part number SSM1860.

One of ordinary skill in the art will readily appreciate that the components and functions of the present system may also be implemented using COTS parts for one or more of the controllers 440A-440E, T/R channel components 112, PAs, LNAs, and/or DM1. Such implementations are well within the skill of an ordinary practitioner in these arts.

Overall AESA noise performance may be improved by the noted use of appropriate LNAs in each of the Receive Sum Channel, Receive Delta Elevation Channel, and Receive Delta Azimuth Channel RF paths. In some embodiments, one or more of low noise amplifiers 420A-420D may be implemented in a Gallium Arsenide (GaAs) MMIC, although alternatives will be readily apparent to those of ordinary skill in the art. Furthermore, these components may be fabricated as part of a MMIC or may be separate components.

Isolation devices (e.g., isolators) are placed at the input and output in each signal path of the monopulse processor, thus greatly improving RF isolation between signal paths and improving the RF match in each signal path. Isolators 430A-430H reduce unwanted coupling as a function of frequency, which may be critical given the higher degree of correlated errors between monopulse processors. In some embodiments, one or more of isolators 430A-430H may be implemented as embedded circulators with a terminated port and may be fabricated as part of a MMIC or may be separate components.

In some embodiments, power amplifier 450 may be implemented in a Gallium Nitride (GaN) MMIC, although alternatives will be readily apparent to those of ordinary skill in the art. Furthermore, these components may be fabricated as part of a MMIC or may be separate components.

The active controllers 440A-44E, low noise amplifiers 420A-420D, and power amplifier 450 in the monopulse processor may be implemented as flip-chip MMICs, according to techniques commonly used in the art. This enables using the same brazement to heat sink the MMICs on the monopulse processor and any associated circuitry. In some embodiments, the T/R channel components may be mounted on a separate printed wiring board or daughter-cards for convenience in handling and test. This may be advantageous for improving gain and phase stability for all MMICs, especially for those used in the monopulse processor.

Overall AESA noise performance may be improved by the noted use of appropriate LNAs in each of the Receive Sum Channel, Receive Delta Elevation Channel, and Receive Delta Azimuth Channel RF paths.

Thus, the single active monopulse board (AMB) 130 has three input ports (designated Rx Sum Signal In 401, ΔEl In and ΔAz In 402, 403). The input ports are coupled to receive signals from output ports of a monopulse level-1 beamformer which may be the same as or similar to the type described above in conjunction with FIG. 12.

The active monopulse board includes a plurality of controllers designated U1-U5 with each controller performing a specified function as described herein. In particular: controller U1 440E corresponds to a controller for the receive sum channel; controller U2 440C corresponds to a controller for the receive delta elevation coupled channel; controller U3 440D corresponds to a controller for the receive delta azimuth "coupled" channel; controller U4 440A corresponds to a controller for the receive delta azimuth "replica" channel; controller U5 440B corresponds to a controller for the receive delta elevation "replica" channel. In the exemplary embodiment of FIG. 13, the controllers may, for example, be provided as monolithic microwave integrated circuits (MMICs) and in particular may be provided as Silicon-Germanium (SiGe) MMICs.

The single active monopulse board further includes 3 RF signal output ports with a first one of the RF output ports corresponding to a transmit/receive sum port, a second one of the RF output ports corresponding to a receive Delta Elevation port and a third one of the RF output ports corresponding to a receive Delta Azimuth output port (designated TX/RX Σ Out, ΔEl Out and ΔAz Out).

For the receive sum channel, a receive sum signal propagates through a circulator Ci1 and is subsequently amplified by a low noise amplifier (LNA) (LN1). The so-amplified signal is then split (via a signal splitter/power divider circuit) into a receive sum channel output signal (designated RX Sum Signal) and a replica channel signal (designated "Replica Signal"). Amplitude weighting and phase shifting is applied electronically with appropriate ones of active controllers U1-U5. In one embodiment, the active controllers are provided as (SiGe) Silicon-Germanium (MMICs) Monolithic Microwave Circuit.

The replica channel signal is again split into the following signals: (a) an "Azimuth Replica Signal;" and (b) an "Elevation Replica Signal".

The Azimuth Replica Signal propagates through an isolator S5, an active controller U4 and finally through an isolator S7. The signal is then combined with the receive azimuth channel signal path to produce a receive azimuth channel output signal.

The receive Delta Elevation signal propagates through an isolator S6, an active controller U5 and finally through an isolator S8. The receive Delta Elevation signal is then combined with a receive Elevation channel signal (provided from a receive Elevation channel signal path) to produce a receive elevation channel output signal.

In the receive elevation coupled channel, the signal propagates through isolator S2, amplified by an LNA (LN2), active controller U2 and finally through an isolator S9. The signal is then combined with the receive elevation replica signal path to produce the receive elevation channel output 409 (designated as "ΔEl Out" in FIG. 14).

In the receive azimuth coupled channel, the receive delta azimuth signal propagate through isolator S3, amplified by an LNA (LN3), an active controller U3 and finally through an isolator S10. The signal is then combined with the receive azimuth replica signal path to produce the "receive azimuth channel output" at port 408 ("ΔAz Out" in FIG. 14).

Referring now to FIG. 14, an active monopulse board includes controllers U1-U5, low noise amplifiers (LNAs) LN1-LN3 and power amplifier PA1 coupled as shown.

FIG. 14 illustrates how signals are received from a beamformer, split, amplitude and phase weighted, and then recombined to form three-channel monopulse signals.

A Receive Sum RF signal is denoted by Path 2. The receive sum signal from the monopulse Level-1 Beamformer (not shown in FIG. 14) goes through a circulator (Ci1, FIG. 3) and is amplified by LNA LN1. The signal is then split: Path 2 RF signal is amplitude and phase weighted by the U1 MMIC; Paths 3 and 4 are generated by another 3 dB signal split. (On transmit, the transmit/receive port on the active monopulse Output side is energized, phase shifted by SiGe U1 and amplified by Gann (Gallium Nitride) PA (Power Amplifier) (PA1)).

An output Receive Delta Elevation signal is generated by combining RF signal paths 4 and 5. Path 4 is called the "Replica Delta Elevation" RF path and is amplitude and phase weighted by the U4 MMIC. Path 5 is called the "Coupled Delta Elevation" RF path and is amplitude and phase weighted by the U2 MMIC. Path 4 and 5 signals are then combined forming the "Receive Delta El" output RF signal.

An output Receive Delta Azimuth signal is generated by combining RF signal paths 3 and 6. Path 3 is called the "Replica Delta Azimuth" RF path and is amplitude and phase weighted by the U5 MMIC. Path 6 is called the "Coupled Delta Elevation" RF path and is amplitude and phase weighted by the U3 MMIC. Path 3 and 6 signals are then combined forming the "receive Delta Az" output RF signal.

Advantageously, both the monopulse beamformer module and the monopulse processors modules can be RF tested prior to assembly.

In summary, the scalable, analog monopulse network calibration technique is capable of being used with any AESA comprised of sub-arrays; for the example presented in herein, the BFR AESA was based on a 128 T/R channel panel array employing the scalable, analog monopulse network. The scalable, analog monopulse network calibration innovations include, but are not limited to: (a) the ability to be implemented on a far-field range or compact range; the T/R channel measurements would be cycled as in a traditional near-field measurement for the Receive sum channel calibration; (b) the technique is invariant to the receive sum channel amplitude weighting (this is so because the Delta Az and Delta El channels are formed from the coupled signals off the Receive Sum channel; therefore, any general weighting on the Receive Sum Channel is coupled (or sampled) by the couplers in the monopulse level-1 beamformer. The coupler values in the monopulse level-1 beamformer are chosen independently from the Receive Sum channel amplitude weighting); (c) the technique is invariant to the to the size of the AESA; (d) the far-field distance for monopulse channel calibration is based upon the sub-array overall physical size. For the example case of the SEC AESA, the far-field distance of the 128 T/R channel panel array was 16.9 ft; (e) the technique results in reduced monopulse channel average power sidelobe level and the affect of random errors is reduced by a factor of N or 10*log(N) dB; (f) the calibration technique results in reduced sum channel, delta elevation channel and delta azimuth channel noise figures. For the SEC AESA using the scalable, analog monopulse network, part of the receive sum channel weighting is moved to each active monopulse board U1 MMIC. The U1 control MMIC amplitude weighting is applied to all 128 T/R channels of the panel associated with the given active monopulse board; and (g) there are no restriction on active monopulse board (AMB) controller technology (for example, in the case of the above-described SEC AESA, the controller MMIC was provided as a SiGe MMIC; however, after reading the disclosure provided herein, those of ordinary skill in the art will appreciated that the described calibration technique can be used with controllers implemented using a wide variety of different technologies.

It should be appreciated that the concepts described herein may be embodied in hardware, software, or any combination thereof, as those terms are currently known in the art. In particular, portions of the present apparatus may be implemented in software, firmware, and/or microcode operating on a computer or computers of any type. Additionally, software embodying the present invention may comprise computer instructions in any form (e.g., source code, object code, and/or interpreted code, etc.) stored in any computer-readable medium and used with the devices disclosed herein. Accordingly, the present invention is not limited to any particular platform, unless specifically stated otherwise in the present disclosure.

While particular embodiments of the present invention have been shown and described, it will be apparent to those skilled in the art that various changes and modifications in form and details may be made therein without departing from the spirit and scope of the invention as defined by the following claims. Accordingly, the appended claims encompass within their scope all such changes and modifications.

We claim:

1. A calibration process for an analog monopulse network in a phased array having a sub-array of antenna elements, the process comprising:
   calibrating a receive sum channel using a near-field data collection technique to generate receive sum channel calibration values; and
   after generating receive sum channel calibration values, calibrating at least one receive delta channel using a far-field data collection technique wherein the generated receive sum channel calibration values are used in the calibrating of each of the at least one receive delta channels.

2. The process of claim 1 wherein calibrating at least one receive delta channel comprises calibrating a first one of a receive delta elevation channel and a receive delta azimuth channel using a far-field data collection technique wherein the generated receive sum channel calibration values are used in the calibrating of the first one of the receive delta elevation and receive delta azimuth channels.

3. The process of claim 2 wherein after generating receive sum channel calibration values, the process further comprises calibrating a second one of the receive delta elevation and receive delta azimuth channels using a far-field data collection technique wherein the generated receive sum channel calibration values are used in the calibrating of the second one of the receive delta elevation and receive delta azimuth channels.

4. The process of claim 1 wherein calibrating at least one receive delta channel comprises calibrating both a receive delta elevation channel and a receive delta azimuth channel using a far-field data collection technique wherein the generated receive sum channel calibration values are used in the calibrating of the second one of the receive delta elevation and receive delta azimuth channels.

5. The process of claim 1 wherein calibrating a receive delta channel in the far-field comprises:
   (a) arranging a near-field test probe in a far-field of the phased array;
   (b) selecting a first panel of the array;
   (c) centering a waveguide probe on the selected panel and uploading the receive sum calibration values to the selected first panel;
   (d) turning on the selected panel in a receive mode while all other panels in the array are turned off or placed in a stand-by mode;
   (e) making a set of RF measurements;
   (f) after the set of measurements are made, turning the panel off;
   (g) selecting a next panel;
   (h) moving the waveguide probe to the center of the selected next panel;
   (i) turning the selected next panel on and all other panels off; and
   (j) repeating (c) - (i) until each panel has been measured.

6. The process of claim 5 wherein the receive channel corresponds to a receive delta elevation channel.

7. The process of claim 5 wherein the receive channel corresponds to a receive delta azimuth channel.

8. The method of claim 1 wherein the near-field data collection technique is provided as a near-field scan approach.

9. The method of claim 8 wherein the near-field scan approach is provided as a planar near-field scan approach comprising:
   (a) turning on a single selected T/R sum channel in receive mode while placing all other T/R sum channels in an off mode or in a stand-by mode; and
   (b) measuring RF values of the single selected T/R sum channel using a near-field RF probe.

10. The method of claim 9 wherein measuring RF values of the single selected T/R sum channel using a near-field RF probe comprises measuring RF values of the single selected T/R sum channel using a near-field RF probe over a plurality of different digital attenuation and phase values for the single selected T/R sum channel and a plurality of T/R sum channel operating frequencies.

11. The method of claim 8 wherein the planar near-field scan approach comprises:
   (a) turning on a single selected T/R sum channel in receive mode while placing all other T/R sum channels are in an off mode or in a stand-by mode;
   (b) selecting a first one of a plurality of T/R sum channel operating frequencies;
   (c) selecting a first one of a plurality of digital attenuation and phase values for the single selected T/R sum channel;
   (d) setting digital attenuation and phase of the single selected T/R sum channel to the selected digital attenuation and phase values;
   (e) using a near-field RF probe to make RF measurements of the single selected T/R sum channel;
   (g) determining if measurements of the single selected T/R sum channel have been made at all of the plurality of digital attenuation and phase values for the single selected T/R sum channel; and
   (h) in response to measurements of the single selected T/R sum channel not having been made at all of the plurality of digital attenuation and phase values for the single selected T/R sum channel, selecting a next one of the plurality of digital attenuation and phase values for the single selected T/R sum channel and setting the digital attenuation and phase of the single selected T/R sum channel to the selected digital attenuation and phase values.

12. The method of claim 1 wherein calibrating the transmit receive sum channel comprises:
   turning on a single T/R sum channel in receive mode;
   placing all other T/R sum channels in an off or in a stand-by mode; and
   measuring RF values using the waveguide probe.

13. The method of claim 12 wherein measure RF values using the waveguide probe comprises, at each of a plurality of different frequencies, making RF measurements while cycling digital attenuation and phase of the given T/R sum channel.

14. The method of claim 5 wherein making a set of RF measurements comprises:
   emitting an RF signal via the waveguide probe; and
   measuring the response at the output of a receive delta elevation channel and a receive delta azimuth channel.

15. A calibration process for an analog monopulse network in a phased array having at least a sum channel and two difference channels, and comprised of a plurality of subarrays, the calibration process comprising:
   calibrating a receive sum channel using a near-field calibration technique to generate a set of sum channel calibration values;
   uploading the sum channel calibration values to the array; and
   calibrating one or more receive delta channels using a far-field calibration process.

16. The calibration process of claim 15 wherein calibrating the receive sum channel comprises:
   turning on a single T/R channel in receive mode and turning off all other T/R channels; and
   at each frequency of interest, making RF measurements of the receive sum channel while cycling the T/R channel through a plurality of digital attenuation and phase values to generate a plurality of sum channel calibration values.

17. The calibration process of claim 15 wherein calibrating one or more receive delta channels comprises calibrating at least one of a receive delta elevation channel and a receive delta azimuth channel using a far-field calibration process.

18. The calibration process of claim 15 wherein calibrating one or more receive delta channels comprises calibrating a receive delta elevation channel and a receive delta azimuth channel using a far-field calibration process.

19. The calibration process of claim 15 wherein calibrating one or more receive delta channels using a far-field technique comprises:
   (a) centering a waveguide probe on a selected panel;
   (b) uploading of sum channel calibration values to the panel;
   (c) turning the entire panel on while all other panels are off or in standby mode; and (d) at each frequency of interest, making RF measurements of the one or more receive delta channels while cycling the T/R channel through a plurality of digital attenuation and phase values.

20. The method of claim 19 further comprising:
after (d), turning off the panel;
selecting a next panel in the array;
moving the waveguide probe to the center of the selected panel;
turning the selected panel on while all other panels are off; and
repeating (d).

* * * * *